US012623570B2

(12) United States Patent
Khalid et al.

(10) Patent No.: US 12,623,570 B2
(45) Date of Patent: May 12, 2026

(54) METHOD AND SYSTEM FOR PREDICTING BATTERY CAPACITY DEGRADATION FOR ELECTRIC VEHICLE

(71) Applicant: KING FAHD UNIVERSITY OF PETROLEUM AND MINERALS, Dhahran (SA)

(72) Inventors: Muhammad Khalid, Dhahran (SA); Huzaifa Rauf, Dhahran (SA); Naveed Arshad, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 114 days.

(21) Appl. No.: 18/657,032

(22) Filed: May 7, 2024

(65) Prior Publication Data

US 2025/0346150 A1 Nov. 13, 2025

(51) Int. Cl.
B60L 58/16 (2019.01)
G06N 20/00 (2019.01)
H01M 10/0525 (2010.01)

(52) U.S. Cl.
CPC .............. B60L 58/16 (2019.02); G06N 20/00 (2019.01); *B60L 2240/545* (2013.01); *H01M 10/0525* (2013.01)

(58) Field of Classification Search
CPC .............. B60L 58/16; B60L 2240/545; G06N 20/00; H01M 10/0525
See application file for complete search history.

(56) References Cited

U.S. PATENT DOCUMENTS

| | | | | |
|---|---|---|---|---|
| 10,564,222 | B2 * | 2/2020 | Pajovic ................ | G01R 31/367 |
| 2016/0261131 | A1 * | 9/2016 | Childress .............. | H02J 7/0069 |
| 2019/0113577 | A1 * | 4/2019 | Severson ........... | G01R 31/3842 |
| 2019/0315237 | A1 * | 10/2019 | Trnka ...................... | G07C 5/085 |
| 2020/0011932 | A1 | 1/2020 | Hooshmand et al. | |
| 2020/0097595 | A1 * | 3/2020 | Garg ...................... | G06F 16/245 |
| 2020/0130530 | A1 * | 4/2020 | Tsurutani ................ | B60L 58/16 |
| 2021/0382114 | A1 | 12/2021 | Oyama et al. | |

FOREIGN PATENT DOCUMENTS

| | | |
|---|---|---|
| CN | 113030744 B | 6/2022 |
| CN | 114114051 B | 5/2023 |

* cited by examiner

*Primary Examiner* — Calvin Cheung
(74) *Attorney, Agent, or Firm* — Oblon, McClelland, Maier & Neustadt, L.L.P.

(57) ABSTRACT

A method and a system for predicting a battery capacity degradation for an electric vehicle having a battery are provided. The method comprises extracting and pre-processing a raw dataset comprising a plurality of battery loss indicators and a plurality of battery loss values each corresponding to a plurality of time steps to obtain a pre-processed dataset. The method further comprises selecting a loss indicator subset from the pre-processed dataset at a first time step and a second time step based on a smart feature selection (SFS) algorithm. The method further comprises training a machine learning model with each battery loss indicator at the first and second time steps and the battery loss value at the first time step. The method further comprises determining the battery loss value at the second time step with the machine learning model to predict the battery capacity degradation.

14 Claims, 17 Drawing Sheets

| t \ k | Input Features | | | | | Cyclic Loss Values |
|---|---|---|---|---|---|---|
| | 1 | 2 | 3 | .......... | m | |
| 1 | $f_{11}$ | $f_{12}$ | $f_{13}$ | .......... | $f_{1m}$ | $C_1$ |
| 2 | $f_{21}$ | $f_{22}$ | $f_{23}$ | .......... | $f_{2m}$ | $C_2$ |
| 3 | $f_{31}$ | $f_{32}$ | $f_{33}$ | .......... | $f_{3m}$ | $C_3$ |
| ⋮ | ⋮ | ⋮ | ⋮ | ⋮ | ⋮ | |
| i | $f_{i1}$ | $f_{i2}$ | $f_{i2}$ | .......... | $f_{im}$ | $C_i$ |
| i+1 | $f_{(i+1)1}$ | $f_{(i+1)2}$ | $f_{(i+1)3}$ | .......... | $f_{(i+1)m}$ | $C_{i+1}$ |
| ⋮ | ⋮ | ⋮ | ⋮ | ⋮ | ⋮ | |
| n-1 | $f_{(n-1)1}$ | $f_{(n-1)2}$ | $f_{(n-1)3}$ | .......... | $f_{(n-1)m}$ | $C_{n-1}$ |
| n | $f_{n1}$ | $f_{n2}$ | $f_{n3}$ | .......... | $f_{nm}$ | $C_n$ |

Time Index

FIG. 3

Figure 4:
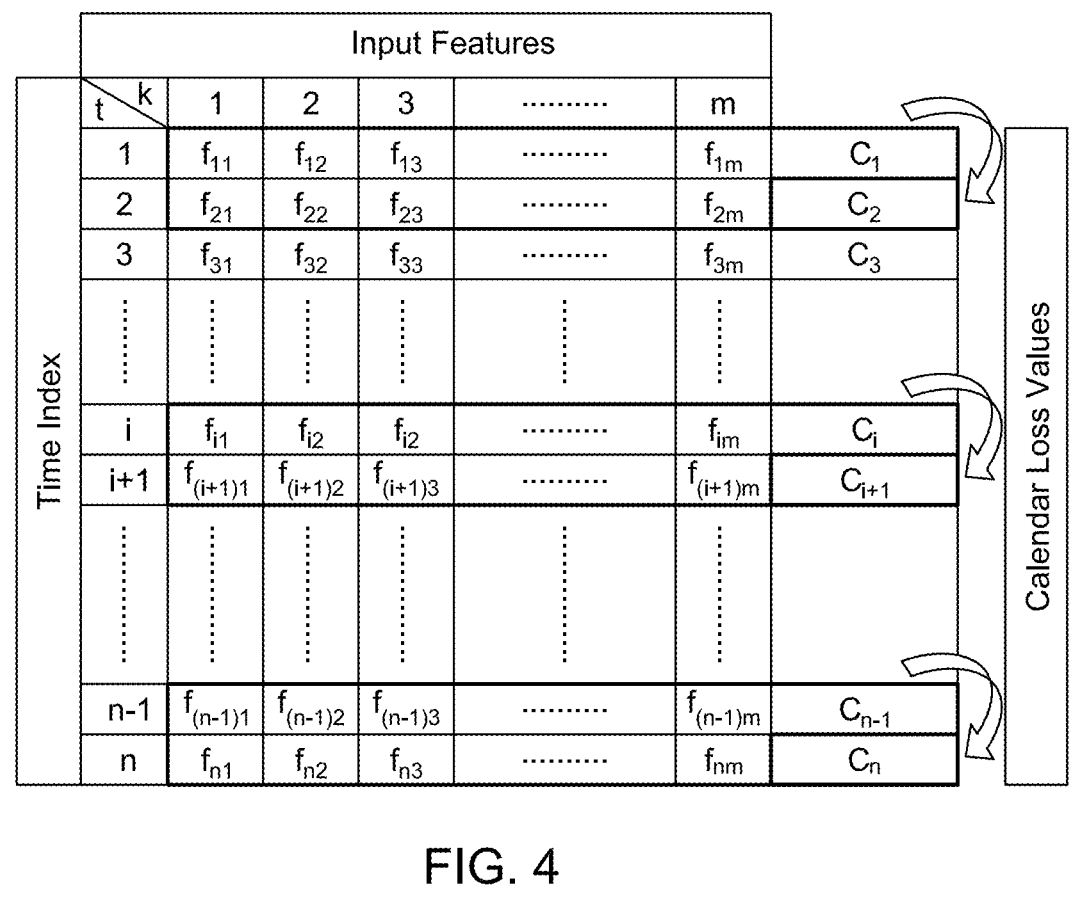

| t \ k | Input Features | | | | | Calendar Loss Values |
|---|---|---|---|---|---|---|
| | 1 | 2 | 3 | ·········· | m | |
| 1 | $f_{11}$ | $f_{12}$ | $f_{13}$ | ·········· | $f_{1m}$ | $C_1$ |
| 2 | $f_{21}$ | $f_{22}$ | $f_{23}$ | ·········· | $f_{2m}$ | $C_2$ |
| 3 | $f_{31}$ | $f_{32}$ | $f_{33}$ | ·········· | $f_{3m}$ | $C_3$ |
| ⋮ | ⋮ | ⋮ | ⋮ | ⋮ | ⋮ | |
| i | $f_{i1}$ | $f_{i2}$ | $f_{i2}$ | ·········· | $f_{im}$ | $C_i$ |
| i+1 | $f_{(i+1)1}$ | $f_{(i+1)2}$ | $f_{(i+1)3}$ | ·········· | $f_{(i+1)m}$ | $C_{i+1}$ |
| ⋮ | ⋮ | ⋮ | ⋮ | ⋮ | ⋮ | |
| n-1 | $f_{(n-1)1}$ | $f_{(n-1)2}$ | $f_{(n-1)3}$ | ·········· | $f_{(n-1)m}$ | $C_{n-1}$ |
| n | $f_{n1}$ | $f_{n2}$ | $f_{n3}$ | ·········· | $f_{nm}$ | $C_n$ |

Time Index

METHOD AND SYSTEM FOR PREDICTING BATTERY CAPACITY DEGRADATION FOR ELECTRIC VEHICLE

STATEMENT REGARDING PRIOR DISCLOSURE BY THE INVENTORS

Aspects of the present disclosure are described in "A novel smart feature selection strategy of lithium-ion battery degradation modelling for electric vehicles based on modern machine learning algorithms", published in Journal of Energy Storage, Volume 68, 107577 which is incorporated herein by reference in its entirety.

STATEMENT OF ACKNOWLEDGEMENT

Support provided by the Saudi Data and AI Authority (SDAIA), Saudi Arabia and King Fahd University of Petroleum and Minerals (KFUPM) under SDAIA-KFUPM Joint Research Center for Artificial Intelligence, Saudi Arabia, grant No. JRC-AI-RFP-08, and the LUMS Energy Institute (LEI) at Lahore University of Management Sciences (LUMS), and the National Center of Big Data and Cloud Computing (NCBC) of the Higher Education Commission (HEC), Pakistan, is gratefully acknowledged.

BACKGROUND

Technical Field

The present disclosure relates generally to the field of battery health management for electric vehicles (EVs), and more specifically to a method and a system for predicting battery capacity degradation, particularly for lithium-ion batteries, utilizing machine learning techniques.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The transition of personal transportation from internal combustion engine (ICE) vehicles to electric vehicles (EV) is a vital step in achieving lower carbon emissions from the transportation sector. EVs and renewable energy systems are widely promoted as clean alternatives to conventional vehicles and power generation, and as promising solutions to effectively reduce GHG emissions and other environmental problems. The rapid development of the EV and renewable energy industry as a clean alternative to fossil-fuel-based vehicles and power generation sources has increased the demand for energy storage technologies. Among the available energy storage technologies, lithium-ion (Li-ion/LIB) batteries have detached as one of the solutions, which can meet the requirements imposed by both power grids and transportation sectors. In recent years, a significant interest in battery-related applications has arisen globally due to reducing fuel consumption, mitigating dependence on imported oil, and decreasing greenhouse gas emissions. Over the last few decades, battery technology has made significant progress in the area of energy storage and plays a key role in EVs and renewable energy systems. The advancements in LIBs have attracted considerable attention due to their high energy density, low maintenance, and the best performance. Meanwhile, the reliability and safety assessment of LIBs has become an important issue, in particular for future EV performance. The energy provision and consumption in LIB-related applications are highly dependent on the health condition of batteries and one main limitation of LIBs resides in battery ageing.

LIBs are increasing in popularity, and there is an increased need to study and model their capacity degradation. The classical problem associated with the EV battery is that it undergoes a sophisticated degradation process during EV operations. Battery degradation gradually happens over time under specific driving conditions and affects EV power consumption due to battery ageing. LIBs undergo operation periods that are substantially shorter than the idle intervals and have different stresses of C-rate, depth-of-discharge (DOD), temperature, and state-of-charge (SOC). LIBs undergo a process to store and provide electrical energy which can last over different time scales. This stationary and transient operation of the Li-ion battery causes calendar and cyclic loss, respectively. Battery degradation takes place in every condition, but in different proportions as usage and external conditions interact to provoke degradation. When a defined degradation level is reached, the battery reaches its end-of-life (EOL) and has to be replaced. To address these difficulties, precise battery degradation models capable of accurately predicting the performance and lifetime of LIBs need to develop. Battery lifetime models are used to predict the long-term degradation behavior of LIB performance metrics such as capacity and internal resistance.

Generally, the phenomena of battery degradation can be classified into two categories: the calendar loss, which refers to the irreversible loss of battery capacity during storage, and the cyclic loss, which occurs due to battery charge and discharge cycles. Cyclic ageing is one of the two main aspects used to model the battery degradation of a LIB. Battery cyclic loss is mainly dictated by the number of battery charging and discharging cycles and is defined as the loss in capacity of the battery when it undergoes a charging or discharging process. This is a direct consequence of the utilization mode, the temperature conditions, and the current use of the battery. Consequently, many factors are involved with cyclic ageing. In particular, the prediction of cyclic loss requires a large variety of activities concentrated on the analysis of battery cyclic loss behaviors of LIBs. In addition, calendar ageing is the other critical aspect used for battery degradation modelling of a Li-ion battery. However, unlike cyclic ageing, it comprises all ageing processes that lead to battery degradation independent of the charge-discharge cycle. Calendar prediction requires a substantial heterogeneous strategy concentrated on the analysis of battery calendar loss behavior of Li-ion batteries.

A comprehensive understanding of the battery aging mechanisms and the ability to accurately predict the cyclic and calendar loss is crucial for battery degradation modelling. An accurate capacity loss prediction and battery degradation model allows for early detection of a battery's inadequate performance which facilitates timely maintenance of battery systems. To accurately model the battery degradation and predict the capacity loss, there is a need for effective techniques and methods to predict the cyclic and calendar loss. There are many factors that affect the battery cyclic and calendar loss, which makes their prediction convoluted. Therefore, it is extremely significant to select a suitable prediction method and devise an accurate model. Among the data-driven techniques, machine learning (ML) is becoming popular for predicting battery degradation trends due to the greater availability of battery data and improved computing. ML methods have recently gained an appreciable research focus due to their finer data integrity, and have shown considerable promise in battery lifetime studies. ML methods can independently realize the relationship between battery capacity loss and external parameters, and establish a prediction model of the battery capacity. Various ML models are employed depending on the data quality, inputs and outputs, test conditions, battery types, and stated accuracy for battery calendar and cyclic loss prediction.

There are different processes linked to ML algorithms, which include data pre-processing, feature selection, model training, and testing. The improvement in the outcomes of these processes considerably enhances the prediction capability. In particular, the accuracy of the capacity loss prediction is greatly affected by the feature selection of the battery data. The model accuracy depends on the correlation between the feature data and the output label greater the correlation, the higher the accuracy of the cyclic and calendar loss prediction model. Nevertheless, different ML-based methods which typically include the aspects of data collection, data pre-processing, feature selection, and training/testing have been thoroughly studied for Li-ion batteries with their main objective to predict the battery capacity, health indicators, and lifetime.

For example, a research used a neural network (NN) to forecast battery lifetime using discharge capacity, terminal voltage, discharge current, and internal resistance. Another research utilized a gradient boosting regression tree (GBRT) model to predict battery life by considering voltage, capacity, and temperature characteristics. Yet another research predicted the battery health by selecting the features from incremental capacity curves and applied a Gaussian process regression (GPR) model, extracted characteristics from voltage curves and predicted battery health using a support vector machine (SVM) model, or utilized an online extreme ML method which is used to predict the capacity of LIBs. A study used two features of equal charging and discharging voltage difference time interval, and established their relationship model with capacity using support vector regression to evaluate online capacity. Another study applied NN that integrated a convolutional neural network (CNN) and long short-term memory (LSTM) to predict capacity loss. Yet another study selected 14 features, including charging time, temperature and voltage curve slope, as the feature vectors of battery degradation in the charging process of Li-ion battery, and predicted remaining capacity by the relevance vector machine (RVM).

For another example, a research predicted the battery capacity using NN and the battery charging time, discharging time, and discharge capacity as characteristic features. Another research identified four features from constant-current charging curves and predicted the battery SOH using an enhanced GPR model. Yet another research applied a feed-forward neural network (FFNN) to predict the current battery cycle number after sampling the battery terminal voltages during the charging process.

Each of the aforementioned references suffers from one or more drawbacks hindering their adoption. In these studies, the capacity loss is modelled using different feature selection techniques to predict battery health, and capacity to failure threshold, which is then used to predict remaining useful life (RUL). The literature discusses different methods for feature selection which are used in combination with ML algorithms. The existing approaches have shown satisfactory performance in predicting battery lifetime. However, due to the limitations and variations in battery datasets, the feature selection methods need to be robust as extracting meaningful information from the raw data is necessary. Therefore, there is a need for a solution that provides a more flexible, accurate, and real-time prediction framework, thereby supporting improved battery health management and extending the operational lifespan of EV batteries.

SUMMARY

In an exemplary embodiment, a computer-implemented method of predicting a battery capacity degradation for an electric vehicle having a battery is provided. The method comprises extracting and pre-processing a raw dataset comprising a plurality of battery loss indicators and a plurality of battery loss values each corresponding to a plurality of time steps to obtain a pre-processed dataset. The method further comprises selecting a loss indicator subset from the pre-processed dataset at a first time step and a second time step of the plurality of time steps based on a smart feature selection (SFS) algorithm. Herein, the first time step is immediately prior to the second time step. The method further comprises training a machine learning model with each battery loss indicator of the plurality of battery loss indicators in the loss indicator subset at the first and second time steps of the plurality of time steps and the battery loss value at the first time step. The method further comprises determining the battery loss value at the second time step with the machine learning model to predict the battery capacity degradation.

In some embodiments, the plurality of battery loss values includes a battery cyclic loss value and a battery calendar loss value.

In some embodiments, the SFS algorithm comprises extrapolating the loss indicator subset to fill missing values in the pre-processed dataset. The SFS algorithm further comprises extracting a mapping relationship between the plurality of battery loss indicators and the plurality of battery loss values from the pre-processed dataset at each time steps of the plurality of time steps based on a quantitative correlation analysis. The SFS algorithm further comprises selecting one or more battery loss indicators from the plurality of battery loss indicators in the pre-processed dataset based on the mapping relationship to obtain the loss indicator subset.

In some embodiments, the plurality of battery loss indicators includes a distance travelled by an electronic vehicle having the lithium-ion battery, a charging efficiency of the lithium-ion battery, a discharging efficiency of the lithium-ion battery, an energy consumption at the first and second time steps, an internal resistance of the lithium-ion battery, and a temperature.

In some embodiments, the training further comprises splitting the loss indicator subset into a training data and a testing data. The training also comprises training the machine learning model with the training data. The training also comprises validating the machine learning model with the testing data.

In some embodiments, the machine learning model is selected from Linear Regression, Ridge Regression, Lasso Regression, Support Vector Regression, Gaussian Process Regression, Random Forest, ElasticNet, and XGBoost.

In some embodiments, the battery is a lithium-ion battery.

In some embodiments, the raw dataset includes a real-time data including a plurality of operating conditions obtained from the electric vehicle while operating.

In another exemplary embodiment, a battery health management system to predict a battery capacity degradation for an electric vehicle having a battery is provided. The battery health management system comprises a system processor communicatively connected to a vehicle control unit of the electric vehicle and configured to execute a program instruction. The battery health management system further comprises a memory connected to the system processor and configured to store a raw data. The program instruction comprises extracting and pre-processing the raw dataset comprising a plurality of battery loss indicators and a plurality of battery loss values each corresponding to a plurality of time steps to obtain a pre-processed dataset. The program instruction further comprises selecting a loss indicator subset from the pre-processed dataset at a first time step and a second time step of the plurality of time steps based on a smart feature selection (SFS) algorithm. Herein, the first time step is immediately prior to the second time step. The program instruction further comprises training a machine learning model with each battery loss indicator of the plurality of battery loss indicators in the loss indicator subset at the first and second time steps of the plurality of time steps and the battery loss value at the first time step. The program instruction further comprises determining the battery loss value at the second time step with the machine learning model to predict the battery capacity degradation.

In some embodiments, the plurality of battery loss values includes a battery cyclic loss value and a battery calendar loss value.

In some embodiments, the SFS algorithm comprises extrapolating the loss indicator subset to fill missing values in the pre-processed dataset. The SFS algorithm further comprises extracting a mapping relationship between the plurality of battery loss indicators and the plurality of battery loss values from the pre-processed dataset at each time steps of the plurality of time steps based on a quantitative correlation analysis. The SFS algorithm further comprises selecting one or more battery loss indicators from the plurality of battery loss indicators in the pre-processed dataset based on the mapping relationship to obtain the loss indicator subset.

In some embodiments, the plurality of battery loss indicators includes a distance travelled by an electronic vehicle having the lithium-ion battery, a charging efficiency of the lithium-ion battery, a discharging efficiency of the lithium-ion battery, an energy consumption at the first and second time steps, an internal resistance of the lithium-ion battery, and a temperature.

In some embodiments, the training further comprises splitting the loss indicator subset into a training data and a testing data. The training also comprises training the machine learning model with the training data. The training also comprises validating the machine learning model with the testing data.

In some embodiments, the machine learning model is selected from Linear Regression, Ridge Regression, Lasso Regression, Support Vector Regression, Gaussian Process Regression, Random Forest, ElasticNet, and XGBoost.

In some embodiments, the battery is a lithium-ion battery.

In some embodiments, the raw dataset includes a real-time data including a plurality of operating conditions obtained from the electric vehicle while operating.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3 is an exemplary depiction of a feature selection-based framework of a smart feature selection (SFS) algorithm for battery cyclic loss, according to certain embodiments.

FIG. 4 is an exemplary depiction of a feature selection-based framework of the SFS algorithm for the battery calendar loss, according to certain embodiments.

DETAILED DESCRIPTION

Figure 1:
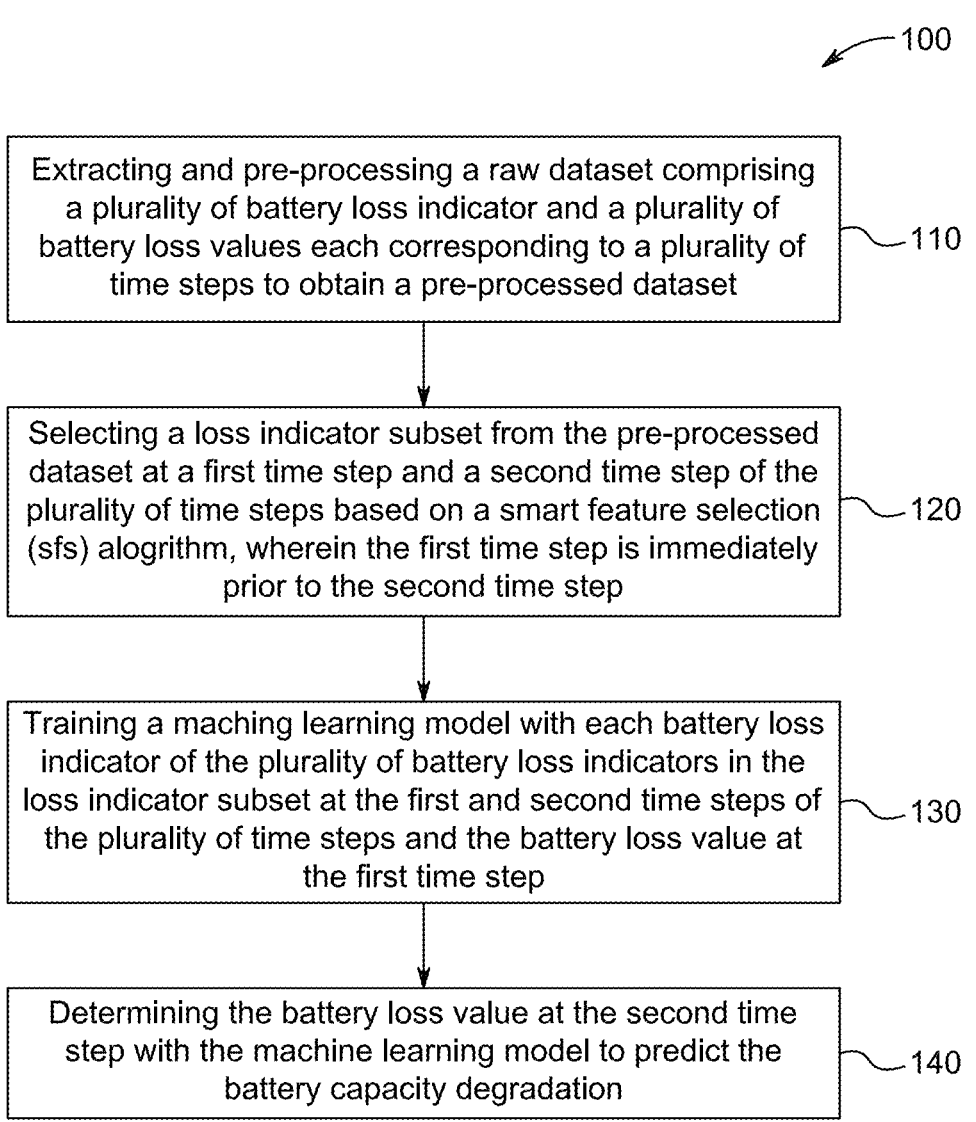
FIG. 1 is an exemplary flowchart listing steps involved in a computer-implemented method of predicting a battery capacity degradation for an electric vehicle having a battery, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a computer-implemented method and a system for predicting battery capacity degradation in electric vehicles (EVs). The present disclosure provides a smart feature selection (SFS) strategy combined with machine learning (ML) algorithms to enhance the accuracy of predicting battery calendar and cyclic losses. The present disclosure involves extracting and preprocessing battery operation data to form a dataset, which is then used to train an ML model. The SFS strategy selects relevant features for the ML model, improving prediction accuracy by focusing on the most significant indicators of battery degradation.

In particular, the present disclosure aims to contribute in terms of devising and evaluating the SFS method which is utilized in the ML algorithms to predict battery cyclic and calendar loss. The present disclosure analyzes the relationship between capacity loss and input features using cyclic and calendar loss prediction and introduces the SFS method that has enhanced the generalization ability and improved the predictive performance of the ML algorithms to accurately predict total capacity loss. A case study has been undertaken for the validation of the framework, in which features are extracted based on battery degradation data using the SFS method which selects features to reflect the battery ageing dynamics from different perspectives. Multiple indicators for battery capacity loss prediction are selected and various ML techniques have been extensively applied to predict cyclic and calendar loss. This leads to effectively predicting the battery capacity loss and demonstrates the effectiveness of the disclosed framework. To manage feature irrelevancy and redundancy, SFS generates a suitable feature subset. The selected feature subset is then fed to eight representative ML algorithms involving linear regression, ridge regression, LASSO regression, elastic net, GPR, SVM, random forest (RF), and XGBoost. Comparative tests are carried out to demonstrate the efficiency of the disclosed framework. The results indicate that the disclosed strategy improves the predictive ability of ML models.

Referring to FIG. 1, illustrated is a flowchart of a computer-implemented method (as represented by reference numeral 100, and hereinafter simply referred to as "method 100") of predicting a battery capacity degradation for an electric vehicle having a battery, as per embodiments of the present disclosure. The term "battery capacity degradation," in present context, refers to gradual and irreversible loss of ability of the battery to store and deliver electrical energy. This degradation process includes both cyclic and calendar losses which occurs over time due to various operational stresses such as charging and discharging cycles, temperature fluctuations, and the depth of discharge. The cyclic loss mainly arises from the battery undergoing charging and discharging processes, whereas the calendar loss refers to the capacity loss that occurs irrespective of charge-discharge cycles, often related to the passage of time and idle state of the battery. The degradation of battery capacity is a significant challenge as it directly affects the performance, safety, and reliability of electric vehicles, necessitating accurate prediction and modeling techniques to mitigate its impact and extend battery life.

Predicting the battery capacity degradation is particularly relevant for the electric vehicle (EV) having the battery. One of the primary concerns for EV owners and potential buyers is range anxiety, the fear that an EV will not have sufficient charge to reach its destination. As the battery degrades, its maximum storage capacity diminishes, directly affecting range of the vehicle. Accurate prediction of the battery capacity degradation enables better health management of the battery, ensuring suitable range over lifespan of the vehicle. Also, predicting how and when a battery will degrade allows for more efficient maintenance and replacement scheduling. Further, by predicting the battery capacity degradation, potential safety risks can be identified and mitigated early, ensuring reliability of the electric vehicle and the safety of its occupants.

For purposes of the present disclosure, the battery is a lithium-ion battery. The lithium-ion (Li-ion) batteries are widely recognized for their high energy density, which translates to a greater amount of electrical energy stored in a given size or weight compared to other types of batteries. Such characteristic makes Li-ion batteries particularly suitable for use in the EVs, where maximizing range and efficiency while minimizing weight and volume is important. Lithium-ion batteries also exhibit a low self-discharge rate, enhancing their suitability for EV applications. Moreover, the lithium-ion batteries can support a large number of charging and discharging cycles. The method 100 for predicting the battery capacity degradation is particularly relevant to the unique characteristics and behavior of lithium-ion batteries, considering their widespread use in the electric vehicle industry and the importance of understanding and mitigating their degradation over time to ensure the best performance and lifespan of electric vehicles.

At step 110, the method 100 includes extracting and pre-processing a raw dataset comprising a plurality of battery loss indicators and a plurality of battery loss values each corresponding to a plurality of time steps to obtain a pre-processed dataset. In present embodiments, the raw dataset includes a real-time data including a plurality of operating conditions obtained from the electric vehicle while operating. Such operating conditions may be directly gathered from systems of the electric vehicle during its active functioning. The "plurality of operating conditions" refers to the various states and circumstances under which the battery of the electric vehicle operates, including but not limited to voltage levels, current flows, state of charge, temperature readings, charge and discharge rates, etc. These operating conditions may be continuously monitored and recorded, providing a comprehensive view of behavior and performance of the battery under various real-time scenarios.

As used herein, the "plurality of battery loss indicators" refers to a set of measurable parameters or variables that are indicative of various operational states or behaviors of the battery of the electric vehicle which may influence or reflect its degradation over time. Each of the plurality of battery loss indicators provides insights into different aspects of performance and health of the battery, to provide an understanding of the factors that may contribute to battery degradation. Further, the "plurality of battery loss values" refers to a set of quantified metrics that directly represent the degree or extent of degradation experienced by the battery, recorded across multiple time steps. Collectively, the plurality of battery loss values serve as data points for assessing health and predicting remaining lifespan of the battery, for battery capacity degradation prediction.

In an embodiment, the plurality of battery loss indicators includes a distance travelled by an electronic vehicle having the lithium-ion battery, a charging efficiency of the lithium-ion battery, a discharging efficiency of the lithium-ion battery, an energy consumption at the first and second time steps, an internal resistance of the lithium-ion battery, and a temperature. Herein, the distance travelled refers to a total distance that the electric vehicle has covered over a given period. The charging efficiency of the lithium-ion battery is the ratio of the energy input to the battery during the charging process compared to the energy actually stored. The discharging efficiency is a measure of how efficiently the lithium-ion battery can deliver stored energy to a powertrain of the electric vehicle. The energy consumption is the amount of energy used by the electric vehicle at the first and second time steps, which reflects the discharge rate of the battery over those specific intervals. The internal resistance of the lithium-ion battery indicates the opposition within the battery to the flow of current. The temperature refers to readings associated with operational environment of the lithium-ion battery, particularly the temperature, as temperature extremes can accelerate degradation. Each of these plurality of battery loss indicators provides insights into different aspects of performance and health of the battery, and this help with understanding of the factors that may contribute to the battery capacity degradation.

In an embodiment, the plurality of battery loss values includes a battery cyclic loss value and a battery calendar loss value. Herein, each of the battery cyclic loss value and the battery calendar loss value correspond to specific instances in operational timeline of the battery. The cyclic loss values are primarily associated with the wear and tear that the battery undergoes due to charging and discharging cycles, whereas the calendar loss values refers to the capacity degradation that occurs over time, independent of cycling activities of the battery. In particular, the "battery cyclic loss value" refers to a quantified measure of the degradation or loss in battery capacity primarily due to the repeated charging and discharging cycles that a battery undergoes. The "battery calendar loss value," on the other hand, is a quantified measure representing the battery's capacity reduction that occurs over time, irrespective of the charging and discharging cycles. Collectively, these battery loss values provide data points for assessing health of the battery and predicting its remaining lifespan.

This initial phase in predicting the battery capacity degradation involves the extraction and pre-processing of the raw dataset, including an array of the battery loss indicators with a corresponding set of the battery loss values, cataloged across a series of time steps. The extraction process is designed to collate the raw dataset from various sources, including but not limited to, the vehicle control unit (VCU), battery management systems (BMS), and external sensors. Following the extraction, the raw dataset may be pre-processed to ensure its suitability for subsequent analytical procedures. The pre-processing stage may involve normalization and standardization of the raw dataset, thereby mitigating potential biases from disparate measurement units and scales. Missing values within the dataset may be addressed through extrapolation techniques. In some examples, quantitative correlation analysis is employed to determine the relationships between the battery loss indicators and the battery loss values, to identify the most relevant values impacting battery degradation.

At step 120, the method 100 includes selecting a loss indicator subset from the pre-processed dataset at a first time step and a second time step of the plurality of time steps based on a smart feature selection (SFS) algorithm. Herein, the first time step is immediately prior to the second time step. That is, following the pre-processing of the raw dataset, which includes the normalization and cleaning of the data, the pre-processed data is analyzed to identify the most significant features that contribute to the understanding and prediction of battery loss values. The "loss indicator subset" is a selected group of parameters from the larger set of pre-processed battery loss indicators, chosen for their relevance and significance in relation to battery capacity degradation. This is executed utilizing the SFS algorithm which is designed to analyze the dataset and select a subset of loss indicators, specifically the variables or parameters that have been determined to have a substantive correlation with battery capacity degradation outcomes.

The SFS algorithm operates by evaluating the dataset, often employing techniques such as correlation analysis, information gain, or other statistical methods to determine the predictive strength of each feature. This selective process concentrates on those features that are determined to offer the most informative insights into loss behaviors of the battery, both cyclic and calendar, between consecutive operational intervals.

This selection is made at two consecutive time steps, specifically chosen such that the second time step directly follows the first time step without any intermediate time points. The "first time step" refers to an initial point in operational timeline of the battery, while the "second time step" refers to the subsequent point immediately following the first time step. By evaluating the loss indicators at these adjacent points, the SFS algorithm may determine changes in patterns or values of the loss indicators, which, in turn, may be indicative of degradation of the battery. The loss indicator subset selected by the SFS algorithm at these two time steps incorporates temporal dynamics into the feature selection process, recognizing that the relevance of certain indicators may evolve from one time step to the next. Such a temporally sensitive approach ensures that any machine learning model trained on this data (as discussed later) is equipped to understand not only the static state of the battery but also its trajectory of degradation over time, thus enhancing the precision of the degradation prediction.

As discussed, the SFS algorithm is configured for refining the dataset to be used for training the model. In an embodiment, the SFS algorithm, first, includes extrapolating the loss indicator subset to fill missing values in the pre-processed dataset. Extrapolation is the technique by which the SFS algorithm infers or estimates missing values within the loss indicator subset, utilizing known data points and established patterns. This addresses any instances where data may be incomplete or missing within the pre-processed dataset. The SFS algorithm further includes extracting a mapping relationship between the plurality of battery loss indicators and the plurality of battery loss values from the pre-processed dataset at each time steps of the plurality of time steps based on a quantitative correlation analysis. The SFS algorithm performs the quantitative correlation analysis on the pre-processed dataset to identify the strength and nature of the relationships between the plurality of battery loss indicators and the plurality of battery loss values. This analysis is conducted for each time step within the dataset, and results in mapping relationship that illustrates how different loss indicators relate to actual battery loss values and their potential influence on the battery capacity degradation. The SFS algorithm further includes selecting one or more battery loss indicators from the plurality of battery loss indicators in the pre-processed dataset based on the mapping relationship to obtain the loss indicator subset. That is, based on the mapping relationship determined from the correlation analysis, the SFS algorithm selects the most relevant battery loss indicators from the available battery loss indicators in the pre-processed dataset, to define the loss indicator subset that comprises only those features with the highest predictive value for the battery capacity degradation.

At step 130, the method 100 includes training a machine learning model with each battery loss indicator of the plurality of battery loss indicators in the loss indicator subset at the first and second time steps of the plurality of time steps and the battery loss value at the first time step. This involves a process whereby the machine learning (ML) model is applied to develop a predictive model based on selected features and historical data patterns. The training of the ML model is performed using the set of features (i.e., the loss indicator subset) which has been extracted from the larger pre-processed dataset of the battery loss indicators. The ML model is fed with data from two consecutive time steps, including the first time step and the immediately following second time step, to capture the temporal dynamics of battery degradation. This approach ensures that the ML model can infer not just the static state of the battery at a given moment but also its transition between two closely successive states.

Moreover, the actual observed battery loss value from the first time step is included in the training data. This historical loss value acts as a label or outcome variable that the ML model will learn to predict. The inclusion of this real-world loss value provides the ML model with a reference point to understand how the battery loss indicators relate to actual battery degradation outcomes. During training, the ML model learns to correlate the values of the loss indicators with the known loss value, adjusting its internal parameters to minimize the error between its predictions and the actual observed data. The goal is for the ML model to identify patterns within the loss indicator subset that are indicative of future battery loss values, thereby allowing to predict the battery capacity degradation based on new, unseen data. In some examples, the trained ML model can then be validated and tested to evaluate its predictive accuracy and reliability in estimating battery degradation in real-world electric vehicle operations.

In an embodiment, the training further includes splitting the loss indicator subset into a training data and a testing data. That is, the loss indicator subset is divided into two distinct sets: one for training the ML model, known as the training data, and the other reserved for evaluating predictive performance of the ML model, known as the testing data. This division ensures that the ML model can learn from one set of data and then be independently assessed on another to prevent overfitting, which occurs when a ML model is too closely tailored to the specific data it was trained on and performs poorly on new, unseen data. The training further includes training the machine learning model with the training data. That is, once the training data is divided, it is employed to train the machine learning model. The training further includes validating the machine learning model with the testing data. That is, after the ML model has been trained, the testing data, which was not used during the training phase, is used as a new input to the ML model to assess how well it can generalize its learned patterns to new data. The validation process involves comparing predictions of the ML model of the battery capacity degradation against the actual battery loss values within the testing data. This comparison helps to evaluate the accuracy and reliability of the ML model in predicting the battery degradation under various operational conditions.

In an embodiment, the machine learning model is selected from Linear Regression, Ridge Regression, Lasso Regression, Support Vector Regression, Gaussian Process Regression, Random Forest, ElasticNet, and XGBoost. Each of these models provides distinct advantages for the objective of predicting the battery capacity degradation. A particular model may be selected depending on the specific characteristics of the dataset, such as the linearity of the relationships, the presence of multicollinearity among the predictors, the importance of feature selection, the need to quantify uncertainty, and the computational resources available. It may be appreciated that the incorporation of the SFS algorithm alongside these models further enhances the prediction accuracy by focusing on the most relevant features, thereby improving the generalization capability of the ML model to new, unseen data. More details about each of these models have been discussed later in the description.

At step 140, the method 100 includes determining the battery loss value at the second time step with the machine learning model to predict the battery capacity degradation. Herein, once the ML model has been trained using the selected loss indicator subset, which includes each battery loss indicator from the plurality of battery loss indicators at the first and second time steps, alongside the battery loss value at the first time step, the model is then applied to predict the battery loss value at the subsequent time step, i.e., the second time step. This prediction is aimed at estimating the extent of battery capacity degradation that occurs between these consecutive time steps. The ML model utilizes historical data from the first time step, including the battery loss values and the selected loss indicators, to understand the progression of battery degradation. This historical perspective allows the ML model to infer how certain conditions or usage patterns at the first time step contribute to changes observed at the second time step.

It may be understood that predictions of the ML model are based on the outcomes of the SFS algorithm, which identifies the most relevant features for predicting battery degradation. The SFS algorithm ensures that the ML model focuses on the most predictive indicators, enhancing the accuracy of the capacity degradation forecast. The primary objective at this stage is to estimate the battery loss value at the second time step accurately. This involves the ML model generating a predicted value of battery capacity loss based on the patterns it learned during the training phase. This predicted loss value represents estimation of battery degradation that has occurred between the first and second time steps. The predicted battery loss value at the second time step serves as an indicator of the overall battery capacity degradation. By comparing the battery loss value with actual observed data or with predictions for future time steps, it may be possible to estimate the rate and extent of the battery capacity degradation, for ensuring the reliability and efficiency of the electric vehicle.

It may be appreciated that while the method 100 provides predicting the battery loss value at the second time step, the process is iterative and can be extended to subsequent time steps. By continually applying the machine learning model to new data as it becomes available, the method 100 can provide ongoing assessments of battery health, offering valuable insights into long-term performance and degradation patterns of the battery.

The present disclosure further provides a battery health management system to predict the battery capacity degradation for the electric vehicle having the battery. The battery health management system includes a system processor communicatively connected to a vehicle control unit of the electric vehicle and configured to execute a program instruction. The battery health management system also includes a memory connected to the system processor and configured to store a raw data. The architecture of such battery health management system has been explained in detail later in the description with reference to FIGS. 13-16, without any limitations. The program instruction comprises extracting and pre-processing the raw dataset comprising a plurality of battery loss indicators and a plurality of battery loss values each corresponding to a plurality of time steps to obtain a pre-processed dataset. The program instruction further comprises selecting a loss indicator subset from the pre-processed dataset at a first time step and a second time step of the plurality of time steps based on a smart feature selection (SFS) algorithm. Herein, the first time step is immediately prior to the second time step. The program instruction further comprises training a machine learning model with each battery loss indicator of the plurality of battery loss indicators in the loss indicator subset at the first and second time steps of the plurality of time steps and the battery loss value at the first time step. The program instruction further comprises determining the battery loss value at the second time step with the machine learning model to predict the battery capacity degradation.

Figure 2:
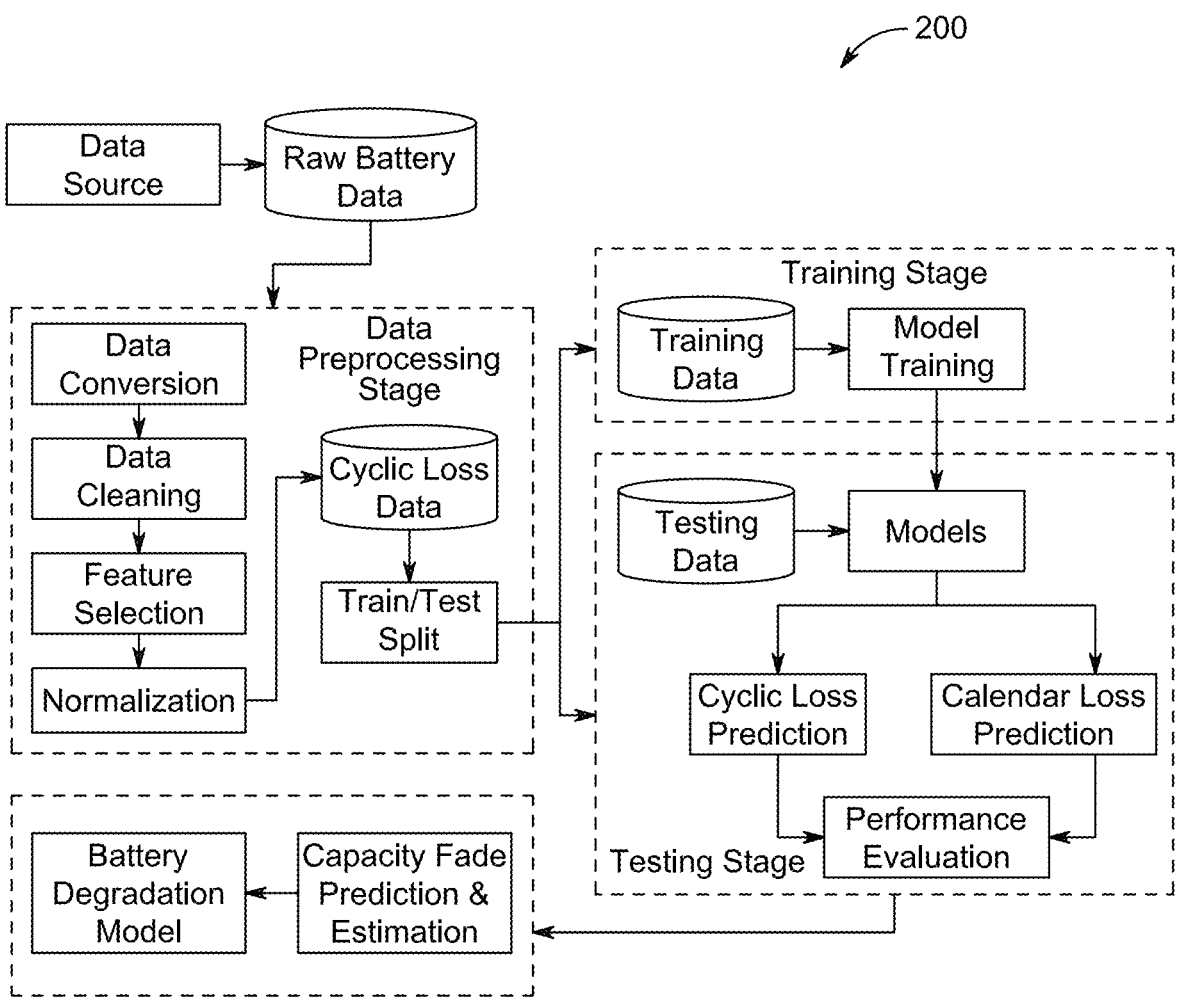
FIG. 2 is an exemplary schematic of a process implemented by a battery health management system for predicting the battery capacity degradation for the electric vehicle having the battery, according to certain embodiments.

Referring to FIG. 2, illustrated is a schematic providing an overview of a process (as represented by reference numeral 200) implemented by execution of the program instruction in the battery health management system for predicting the battery capacity degradation for the electric vehicle having the battery. The process 200 is representative of an architecture of the ML-based framework for battery capacity loss prediction. The process 200 outlines a structured approach including several interconnected stages to facilitate this prediction. In particular, the process 200 depicts the comprehensive flow of data from its initial raw state through to the prediction of the battery capacity degradation, indicating the cyclical nature of model development and refinement necessary for accurate prediction.

As illustrated, in the process 200, the raw dataset is obtained from a data source which may be intrinsic to the electric vehicle, and may include the vehicle control unit or onboard diagnostic systems. This raw dataset is constituted by a plurality of battery loss indicators and a plurality of battery loss values. The battery loss indicators include operational parameters such as distance traveled, energy consumption, temperature profiles, and internal resistance measurements, while the battery loss values are reflective of degradation of the battery of the electric vehicle, specifying cyclic loss and calendar loss values at various operational time steps. The process 200 includes a pre-processing stage, including several sub-steps aimed at refining this raw dataset. Initially, data conversion takes place to ensure that all the battery loss indicators and the battery loss values are in a uniform format, facilitating compatibility and comparability across different data points. Subsequently, data cleaning is performed, which involves removing inaccuracies and outliers, and rectifying any inconsistencies present in the dataset.

Further, the pre-processing stage includes feature selection, which is a process involving the identification and extraction of the most relevant indicators from the raw dataset. This process relies on the SFS algorithm that analyzes the dataset to determine the most relevant indicators for battery loss prediction, thus enhancing efficiency and accuracy of subsequent use of the ML model. The pre-processing stage may further include normalization, which is applied to the dataset post-feature selection. This process scales the selected features to a specified range, typically to normalize the variance and mean of the features, thereby enhancing the predictive performance of the machine learning models and ensuring that no single indicator disproportionately influences the outcome due to its scale. Upon completion of these sub-steps, the resultant pre-processed dataset, now standardized with selected features, is split into the training data and the testing data. These datasets, including the training data and the testing data, are used for training of the ML models, which subsequently predict battery capacity degradation in the form of cyclic and calendar loss values.

Further, as illustrated, the process 200 includes a training stage. Herein, the training data is used in training of the machine learning model. That is, the training data is applied to develop predictive models capable of understanding the patterns of battery degradation. The training involves the machine learning model adjusting its parameters based on the input of each battery loss indicator in the loss indicator subset at the first and second time steps, along with the corresponding battery loss values at the first time step. These trained machine learning model may then be implemented to provide output predictions about the battery capacity loss, specifically the battery cyclic loss value and the battery calendar loss value. Further, in a testing stage of the process 200, the trained machine learning models are subsequently tested against the testing data. The testing stage involves implementing the machine learning models to predict battery degradation outcomes in the form of cyclic loss prediction and calendar loss prediction at subsequent time steps. Subsequently, the testing stage involves performance evaluation, where output of the machine learning model is compared against actual known loss values to assess the accuracy and reliability of the predictions. The performance evaluation measures how well the machine learning model has learned from the training data and its effectiveness in generalizing to new data.

Further, as illustrated, the process 200 involves capacity fade prediction and estimation which provides predictions of the future state of health of the battery. This outputs the estimated battery loss values, such as cyclic and calendar loss at future time steps, based on understanding of the degradation patterns learned from historical data by the machine learning model (as evaluated). This generates a battery degradation model which serves as the computational core, leveraging the smart feature selection (SFS) and machine learning algorithms to analyze battery loss indicators. The battery degradation model utilizes historical data and the relationships uncovered during the training phase to estimate the extent of degradation that a lithium-ion battery in an electric vehicle might experience.

It may be appreciated that the ML techniques are often used to train the complex non-linear degrading behavior of Li-ion batteries based on historical data, and they do not necessitate a thorough grasp of the battery's internal activity. The commonly used ML methods include neural networks (NNs), Support vector machines (SVMs), Relevance vector machine (RVM), and Gaussian process regression (GPR). ML methods rely on input feature selection in the battery data to predict the battery cyclic loss and the battery calendar loss. Typically, the problem lies in analyzing the relationship between the battery input features, and the battery cyclic and calendar loss, which is critical to establishing an accurate capacity loss prediction model. In other words, the performance of cyclic and calendar loss prediction leads to accurate capacity loss prediction, and it mainly depends on the choice of input feature extraction. Due to the limited types of battery data, it is particularly important to extract useful information from the battery data, which is related to battery capacity loss. From a practical point of view, and while considering the difficulty involved in extracting useful features, the efficacy of battery capacity loss prediction is enhanced if the method to extract the features is made efficient and robust.

Herein, the smart feature selection (SFS) approach is utilized to accurately predict the cyclic and calendar loss of the Li-ion batteries which is evaluated in combination with the ML algorithms. The conventional and most commonly used feature selection approach selects the input features of the current time set and applies ML methods considering these features. On contrary, the disclosed SFS approach involves the selection of all input features of the previous and the current time step. In addition, the SFS approach also takes into consideration the previous time step output label as an input feature for model training (illustrated in FIGS. 3 and 4, and discussed in the proceeding paragraphs). The ML algorithms are subsequently applied considering those selected features.

In embodiment of the present disclosure, the SFS algorithm is applied as a feature selection technique for different ML methods to predict the battery cyclic and capacity loss. The SFS algorithm selects the cyclic and calendar loss features of previous and current time steps along with the previous time step's estimated cyclic loss and calendar loss output labels to devise the ML-based prediction framework. The current time step's cyclic loss and calendar loss outputs are taken as an input feature to the ML model to predict the future cyclic and calendar loss values. This can limit the effect of the accumulated error, as the ML model is trained on both the features and recursive inputs. Predictions are made over a period of time by recursively feeding the model outputs from earlier time steps in as inputs for later time steps. The SFS algorithm evaluates the current and previous time step features information to better reflect the cyclic and calendar loss prediction, and resolve the problem of error accumulation by reducing the prediction error using the output labels of the previous time step. The SFS algorithm provides a direct approach which aims to avoid error accumulation by creating a separate model for each potential time horizon. The SFS algorithm is integrated to extract the mapping relationship between the selected features and the cyclic loss/calendar loss, which leads to the prediction of the battery capacity loss.

Referring to FIG. 3, illustrated is a feature selection-based framework of the SFS algorithm for the battery cyclic loss. It is mathematically represented as:

$$C_{cyc(t)} = \{(CY_t, t) \mid CY_t \in \mathbb{R}, t \in \mathbb{N} \wedge t \leq n\} \tag{1}$$

where $CY_c$, is the cyclic loss output that represents the battery cyclic loss value at the time index value t. Here t is represented as t=1, 2, . . . , n and n represents the total number of time steps considered for the evaluation. For every cyclic loss value $CY_t$, there are associated input features which are represented as ftk. In the set notation form, the feature set is represented as:

$$F_{cyc(tk)} = \{(f_{tk}, t, k) \mid f_{tk} \in \mathbb{R}^{n \times m}, t \in \mathbb{N}, k \in \mathbb{N} \wedge t \leq n, k \leq m\} \tag{2}$$

Similarly, for future cyclic loss value $CY_{t+1}$, there are associated input features which are represented as $f_{(t+1)k}$, where k shows the feature index which is represented as k=1, 2, . . . , m and m denotes the total number of input features for each cyclic loss output value. In the set notation form, the input feature set corresponding to cyclic loss is represented as:

$$F_{cyc(t+1)k} = \{f_{(t+1)k} \mid f_{(t+1)k} \in \mathbb{R}^{n \times m}\} \tag{3}$$

The feature sets of cyclic loss values are characterized as $f_{1k} \rightarrow CY_1, f_{2k} \rightarrow CY_2, \ldots, f_{nk} \rightarrow CY_n$. According to the SFS method, the input feature set which is used for the prediction of the future time step's cyclic loss $CY_{t+1}$, is denoted by $F_{cyc[c(t+1)]}$ and is given as a function of $f_{tk}, f_{(+1)k}$ and $C_{cyc(t)}$:

$$F_{cyc[c(t+1)]} = f\left(f_{tk}, f_{(t+1)k}, C_{cyc(t)}\right) \tag{4}$$

where $f_{tk}$, and $f_{(t+1)k}$ are the n×m input feature vector sets which correspond to the present time step's cyclic loss $CY_t$, and future time step's cyclic loss $CY_{t+1}$, respectively. The SFS-based input feature set $F_{cyc[c(t+1)]}$ is used to predict the future time step's cyclic loss $CY_{t+1}$.

Further, referring to FIG. 4, illustrated is a feature selection-based framework of the SFS algorithm for the battery calendar loss. Herein, $CL_t$ is considered as the calendar loss output that represents the battery calendar loss value at the time index value t. Here t is represented as t=1, 2, . . . , n and n represents the total number of time steps considered for the evaluation. It is mathematically represented as:

$$C_{cal(t)} = \{(CL_t, t) \mid CL_t \in \mathbb{R}, t \in \mathbb{N} \wedge t \leq n\} \tag{5}$$

For every calendar loss value, $CL_t$, there are associated input features which are represented as $g_{tk}$. In the set notation form, the feature set is represented as:

$$G_{cal(tk)} = \{(g_{tk}, t, k) \mid g_{tk} \in \mathbb{R}^{n \times m}, t \in \mathbb{N}, k \in \mathbb{N} \wedge t \leq n, k \leq m\} \tag{6}$$

Similarly, for future calendar loss value $CL_{t+1}$, there are associated input features which are represented as $g_{(t+1)k}$. In the set notation form, the input feature set corresponding to calendar loss is represented as:

$$G_{cal(t+1)k} = \{g_{(t+1)k} \mid g_{(t+1)k} \in \mathbb{R}^{n \times m}\} \tag{7}$$

where k shows the feature index which is represented as k=1, 2, . . . , m and m denotes the total number of input features for each calendar loss output value. The feature sets of calendar loss values are characterized as $f_{1k} \rightarrow CL_1$, $f_{2k} \rightarrow CL_2$, . . . , $f_{nk} \rightarrow CL_n$. According to the disclosed feature selection method, the input feature set used to predict the future time step's calendar loss $CL_{t+1}$, is denoted by $G_{cal[C(t+1)]}$ and is given as a function of $g_{tk}$, $g_{(t+1)k}$ and $C_{cal(t)}$:

$$G_{cal[c(t+1)]} = f\left(g_{tk}, g_{(t+1)k}, C_{cal(t)}\right) \tag{4}$$

where $f_{tk}$, and $f_{(t+1)k}$ are the n×m input feature vector sets which corresponds to the calendar loss $CL_t$ and $CL_{t+1}$, respectively. The selected input feature set $G_{cal[c\ (t+1)]}$ for the prediction of the future time step's calendar loss $CL_{t+1}$ is represented as the function of $f_{tk}$, $f_{(t+1)k}$, and $C_{cal(t)}$.

As discussed, ML techniques can be used to train the complex non-linear degradation behavior of the lithium-ion batteries gathered from historical data, and they do not necessitate a thorough understanding of the battery's internal activity. ML employs a general fitting function with parameters tailored to predict battery capacity loss and degradation behavior. In the present disclosure, the SFS approach is used in combination with ML models to build an accurate battery cyclic and calendar loss prediction model. Eight representative ML models, including the Linear Regression (LR), Ridge Regression (RR), Lasso Regression (LSR), Support Vector Regression (SVR), Gaussian Process Regression (GPR), Random Forest (RF), ElasticNet, and XGBoost are investigated for the performance evaluation of the SFS strategy, and their application to battery cyclic and calendar loss prediction. The structure and framework of these methods are given in the proceeding paragraphs.

Linear Regression (LR)

LR is a mathematical model that describes the relationship between explanatory feature variables and a target variable. LR aims to make predictions about the target variable based on the known feature variables according to the following equation:

$$y = hx + c \tag{9}$$

where y is the target variable, x is the vector set of input feature variables, h is the vector of fitting parameters, and c is the y-intercept term. To predict the battery capacity loss using SFS, the model considers m number of features of the current time step as well as m number of features of the previous time step, along with the previous step's target variable, which makes a total of 2 m+1 input features for the model evaluation. Assuming that the total number of selected input features 2 m+1, is represented by h that is: h=2 m+1. The model of LR with h number of feature variables, and n observations is as follows:

$$C_{i+1} = f_0 + C_i + c_1 f_{i1} + c_2 f_{i2} + \ldots + c_m f_{im} + \tag{10}$$
$$c_{m+1} f_{(i+1)1} + c_m f_{im} + c_{m+2} f_{(i+1)2} + \ldots + c_{2m} f_{(i+1)m} e_i$$

where i=1, 2, . . . n, $C_{i+1}$ is the target variable, $f_o$ is the y-intercept term, $[c_1, c_2, \ldots, c_{2m}]$ are the regression coefficients, $[f_{i1}, f_{i2}, \ldots, f_{(i+1)1}, \ldots f_{(i+1)\ m}]$ are the input feature variables which are selected through SFS method. ei is the error term which is used to account for the difference between the actual value and the prediction. LR modelling is fast and simple, but when the number of features is large and the number of samples is small, it decreases the generalization performance of the model, resulting in the over-fitting.

Lasso Regression (LSR)

It may be understood that regularization lowers overfitting by penalizing parameter size during parameter prediction. To solve the over-fitting problem, a regularization term of the L1 norm to the main function is added. If the parameter penalization is the L1-norm, the parameters are not only converged towards zero but are set to zero and thus employed as a feature selection approach. The method is known as the least absolute shrinkage and selection operator (LASSO) method. The LASSO regression estimates the coefficients by minimizing the following:

$$\hat{\beta}_{lasso} = \text{argmin}_\beta \left\{ \sum_{i=1}^{n} \left( y_i - \sum_{j=1}^{h} x_{ij} \beta_j \right)^2 + \lambda \sum_{j=1}^{h} |\beta_j| \right\} \tag{11}$$

where $\lambda$ is a penalization parameter that controls the degree of regularization. yi represents the predicted cyclic or calendar loss target variable, $[x_{i1}, x_{i2}, \ldots, x_{ij}, \ldots, x_{ih}]$ represents the SFS based feature set, and $\beta = (\beta_1, \ldots, \beta_h)$ is a h-dimensional row vector of parameters to be identified where h=2 m+1 represents the number of the SFS based features. It can be seen from Eq. (11) that the goal is to find the $\beta$ that minimizes $\hat{\beta}_{lasso}$, so when the $\lambda$ is large, the more the size of the parameters is penalized, thereby, forcing more of the parameters to be zero.

Ridge Regression

Ridge regression is the regularized form of LR, and adds a regularization term of the L2 norm to the main function, as given in Eq. (12). Ridge regression shrinks the regression coefficients by imposing a L2 penalty. The penalty is added to the least-squared algorithm, which is equal to the square of the coefficient. The ridge coefficients minimize the penalized residual sum of squares (SSE) as given in the following equation:

$$\beta^{ridge} = \text{argmin}_\beta \left\{ \sum_{i=1}^{n} \left( y_i - \sum_{j=1}^{h} x_{ij} \beta_j \right)^2 + \lambda \sum_{j=1}^{h} \beta_j^2 \right\} \tag{12}$$

where $\lambda$ is a regularization parameter of the added penalty that controls the shrinkage of regression coefficients. yi represents the predicted battery capacity loss target variable, $[x_{i1}, x_{i2}, \ldots, x_{ij}, \ldots x_{ih}]$ represents the SFS based feature set, and $\rho=(\rho_1, \ldots, \rho_h)$ is a h-dimensional row vector of parameters to be identified. Ridge regression deliberately introduces bias into the prediction of 8 to reduce the variability in the battery cyclic and calendar loss prediction.

Elastic-Net Regression

Elastic-Net regression is a regularized LR model that integrates both L1-norm and L2-norm regularization, known as Lasso and Ridge regression, respectively. The elastic net takes the following form:

$$\hat{\beta}^{elastic} = \mathrm{argmin}_{\beta}\left\{\sum_{i=1}^{n}\left(y_i - \sum_{j=1}^{h}x_{ij}\beta_j\right)^2 + \lambda\left(\alpha\sum_{j=1}^{h}|\beta_j| + (1-\alpha)\sum_{j=1}^{h}|\beta_j^2|\right)\right\} \quad (13)$$

where the argmin function aims to find the value of $\beta$ that minimizes the argument. The first term inside the square bracket is a form of least squares, $y_i$ is an n-dimensional predicted battery cyclic/calendar loss, $[x_{i1}, x_{i2}, \ldots, x_{ij}, \ldots x_{ih}]$ is an n×h matrix of features, and $\beta=(\beta_1, \ldots, \beta_h)$, is an h×1 vector of model coefficients. The second term is the regularization term, which contains two non-negative hyper-parameters $\lambda$, and alpha, of the Elastic-Net model. $\lambda$ is a regularization parameter, and $\alpha$ is a scalar between 0 to 1, which regulates the relative importance of the L1 and L2 norm penalties. For LASSO regression, specific feature coefficients are set to zero, whereas ridge regression shrinks feature weights closer to zero. For a value of $\alpha$ between 0 and 1, the elastic net combines both selection and shrinkage.

Gaussian Process Regression (GPR)

GPR is an effective technique for dealing with complicated battery degradation modelling problems due to its non-parametric nature, which allows for greater ability in capturing complex nonlinear relationships and quantifying the uncertainty in predictions. GPR can predict the battery cyclic and calendar loss by using an appropriate combination of Gaussian processes (GP) to model their behavior, which is denoted as:

$$f(x) \sim N(m(x), k(x_i, x_j)) \quad (14)$$

where $m(x)$ and $k(x_i, x_j)$ are the mean and covariance functions respectively, denoted by:

$$m(x) = E(f(x)) \quad (15)$$

$$k(x_i, x_j) = E[(f(x_i) - m(x_i))(f(x_j) - m(x_j))] \quad (16)$$

The GP $f(x)$ is derived by extending the multivariate Gaussian distribution to infinite dimensions and combining the mean function $m(x)$ and the covariance function $k(x_i, x_j)$. Because the GP is flexible enough to model the genuine mean, the mean function is commonly defined as: $m(x)=0$. The most common choice of co-variance function is the squared exponential kernel which is given as follows:

$$k_{ij} = \theta_f^2 \exp\left(-\frac{1}{2\theta_i^2}\|x_i - x_j\|^2\right) \quad (17)$$

where the co-variance function parameters $\theta^2 f$ and $\theta^2 l$, are two hyper-parameters to be tuned in the GPR, which control the y-scaling and x-scaling, respectively. The GPR method delivers the training probability distribution of possible battery cyclic and calendar loss prediction, which is expressed through the following function:

$$y \sim N\left(0, K(x_i, x_j) + \theta_n^2 I_n\right) \quad (18)$$

where y is a vector of predicted battery cyclic and calendar losses, x denotes the input features, $K(xi, x_j)=(k_{ij})$ n×n is an n-dimensional symmetric positive definite matrix, $I_n$ is an n-dimensional unit matrix, and $$\theta_n^2 I_n$$

is the noise covariance matrix. GPR is further used for the prediction of testing samples by computing the posterior distribution of y through Bayesian theory. The mean value of the posterior distribution of y is the predicted battery cyclic and calendar loss.

Support Vector Regression (SVR)

Battery health and capacity loss prediction problems are primarily classified as regression problems, and when support vector machine (SVM) is used for regression tasks such as battery cyclic and calendar loss prediction, it is referred to as support vector regression (SVR). SVR is suitable for prediction tasks because of its ability to describe the nonlinear correlation of input and output data. Kernels are commonly employed in SVM to aid in the evaluation of nonlinear issues with low feature space by changing them into linear problems with high feature space as formulated in Eq. (19), and (20) below:

$$y = \omega_n \phi(x) + b \quad (19)$$

$$y = \sum_{n=1} \omega_n K(x_i, x_j) + \varepsilon \quad (20)$$

where y is the predicted battery cyclic and calendar loss, and on are the weights of the model connecting feature space to output. x, b, and K (xi, xj) denote input features, intercept, and kernel function, respectively. The purpose of SVR is to develop a epsilon-insensitive error function in which the maximum deviation of predicted battery cyclic and calendar loss y in the training data is less than a preset threshold epsilon while maintaining the function's smoothness to the greatest extent possible.

Random Forest Regression

Random forest (RF) regression is an ensemble learning method that integrates and averages decisions from numerous decision tree (DT) multiple decision tree (DT) models. The RF training approach for battery cyclic and calendar loss prediction is to build N distinct decision trees, with each tree in RF being developed with a randomized subset of predictors. With the addition of such randomness, RF can expand the diversity of trees and capture more patterns in the data. RF regression can be expressed as follows:

$$Y(x) = \frac{1}{N_{tree}} \sum_{i=1}^{N_{tree}} f_i(x) \qquad (21)$$

where Y(x) is the RF model, Ntree is the number of decision trees, and $f_i(x)$ is the ith DT model. $f_i(x)$ is built by randomly sampling a training data subset for each decision tree. The battery cyclic and calendar loss is predicted using RF by averaging the predictions of $N_{tree}$ trees in the forest. The predicted accuracy can be increased by averaging the multiple DT models on the appropriate sub-samples of the dataset.

Extreme Gradient Boosting Regression (XGBoost)

Extreme gradient boosting (XGBoost) is a tree-based ensemble model that uses the boosting statistical approach. It is an implementation of gradient-boosted decision trees designed for speed and performance and is known for its excellent performance. XGBoost generates a tree by combining split characteristics and aggregating multiple 'weak' trees to form a single 'strong' tree with greater stability. During the XGBoost training process, a new simple tree is built in each step to compensate for prior simple trees' prediction residuals, therefore minimizing the loss function. In addition, the prediction result of each tree is reduced by a learning rate factor to prevent over-fitting. The XGBoost algorithm uses advanced regularization techniques to suppress weights, prevent over-fitting, and enhance its performance in real-world scenarios. XGBoost aggregates the results of each decision tree along the way to calculate the final result. Finally, the cyclic and calendar loss output of the XGBoost is formed by aggregating predictions from t base trees using a weighted sum. It is clear that the error minimization performance of XGBoost is high enough and even with a little amount of data, the algorithm predicts with high accuracy.

The prediction accuracy of the aforementioned ML algorithms with the SFS technique can be evaluated by comparing the actual cyclic and calendar loss values from the data values with the empirical or theoretical ones. Mean absolute error (MAE) is the metric applied in this work for evaluating the quality of ML methods with SFS method-based predictions. MAE averages the absolute differences between the tested and predicted values, and is defined by Eq. (22) below. All the errors have the same weight in MAE, and it is evident that the smaller the MAE values, the more accurate the prediction result.

$$MAE = \frac{1}{n} \sum_{i=1}^{n} |y_i - \hat{y}_i| \qquad (22)$$

where n represents the number of observations, $y_i$ represents the real cyclic and calendar loss values and $\hat{y}_i$ represents the predicted cyclic and calendar loss values.

EXAMPLES

Dataset Description

Figure 5:
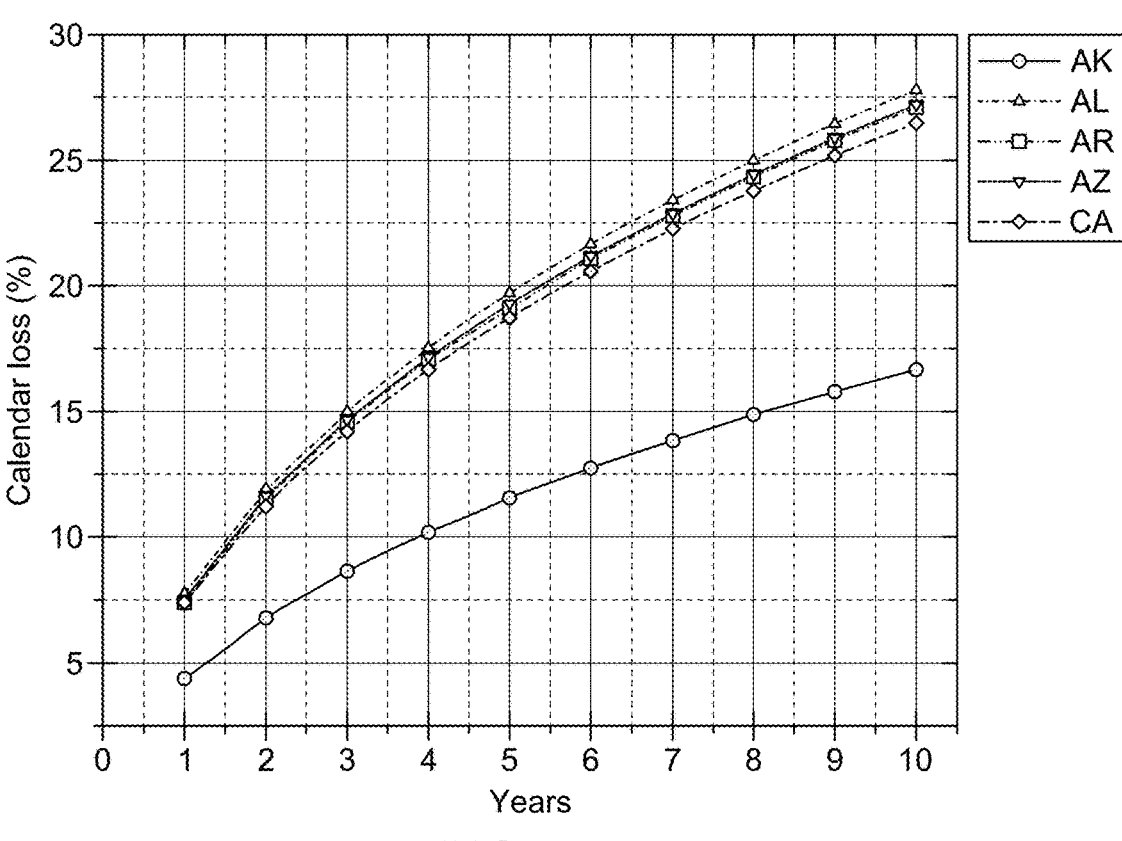
FIG. 5 is an exemplary graph of battery calendar loss percentage of five US states, California (CA), Arizona (AZ), Alaska (AL), Arkansas (AR), and Alabama (AL), according to certain embodiments.
Figure 6:
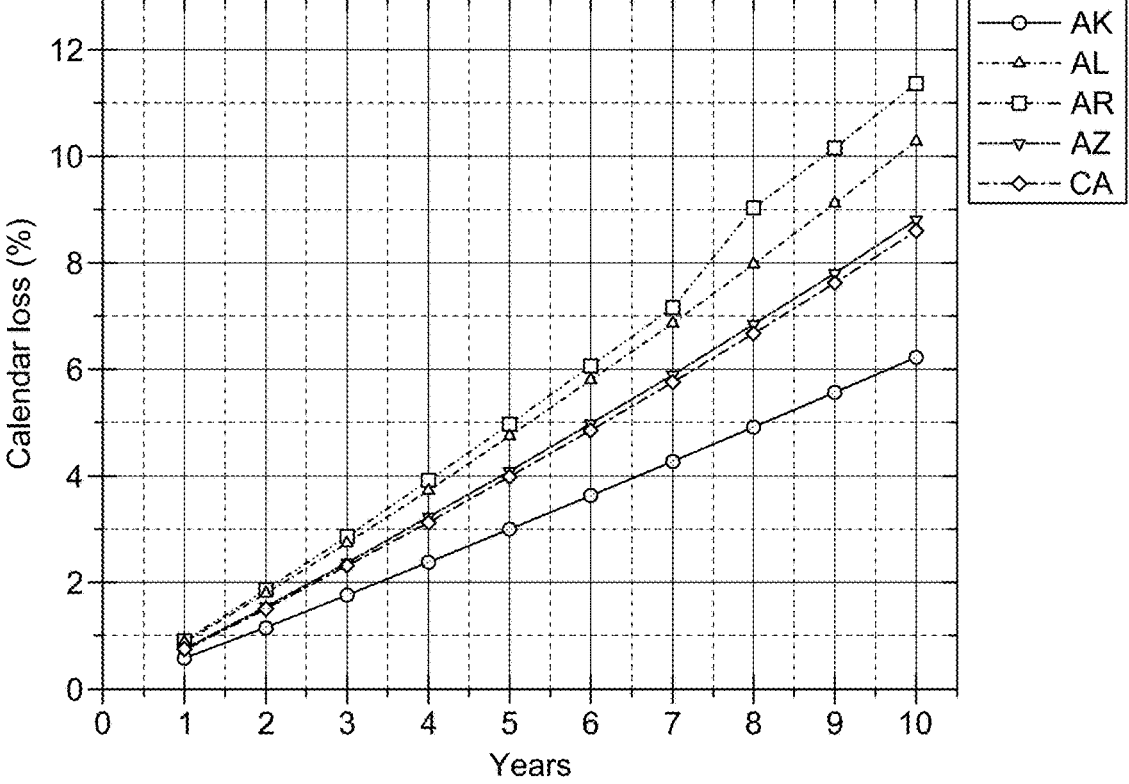
FIG. 6 is an exemplary graph of battery cyclic loss percentage of five US states, California (CA), Arizona (AZ), Alaska (AL), Arkansas (AR), and Alabama (AL), according to certain embodiments.
Figure 7A:
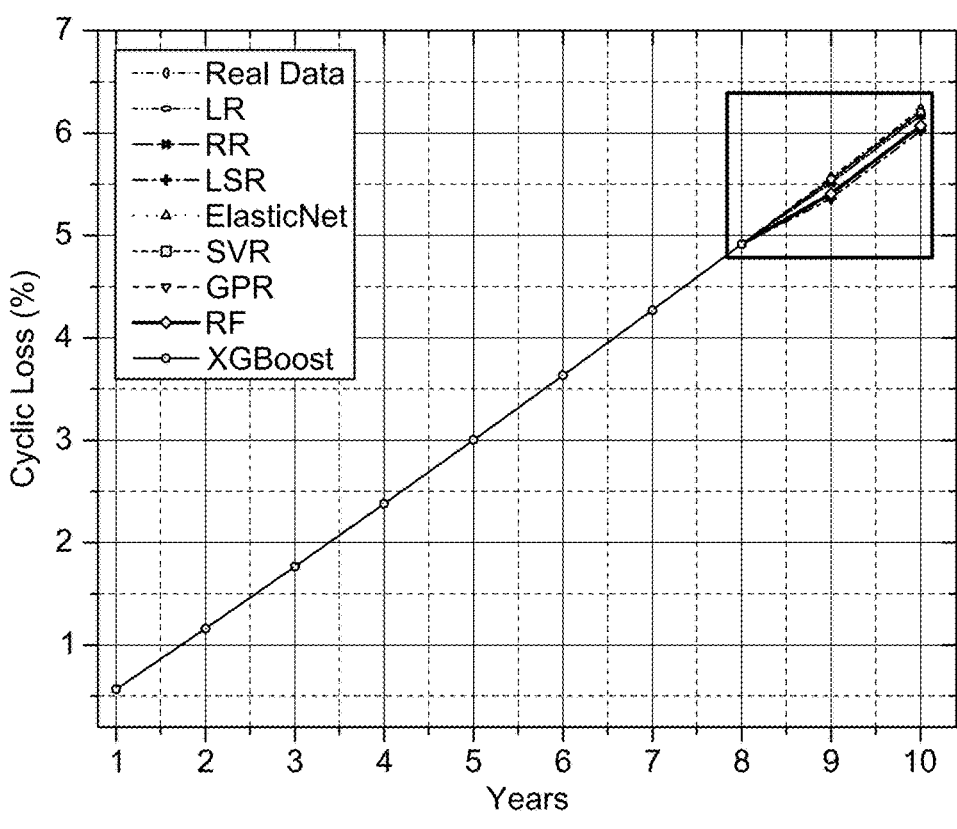
FIG. 7A is an exemplary graph of SFS based ML battery cyclic loss prediction in the US state of Alaska, according to certain embodiments.
Figure 7B:
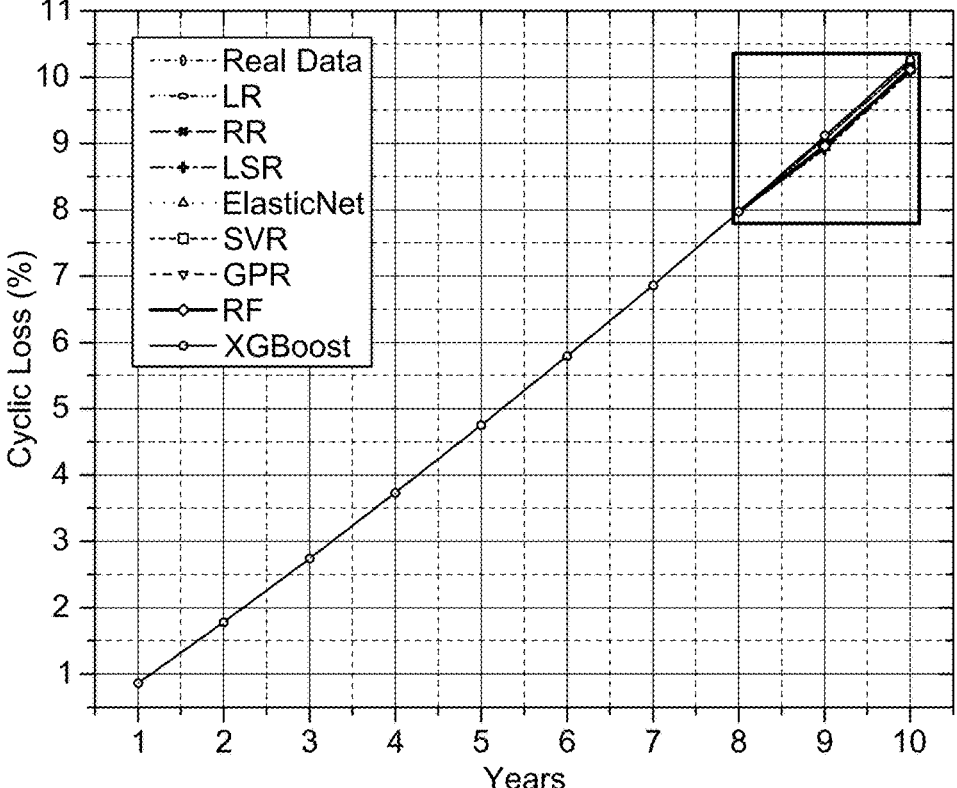
FIG. 7B is an exemplary graph of SFS based ML battery cyclic loss prediction in the US state of Alabama, according to certain embodiments.
Figure 7C:
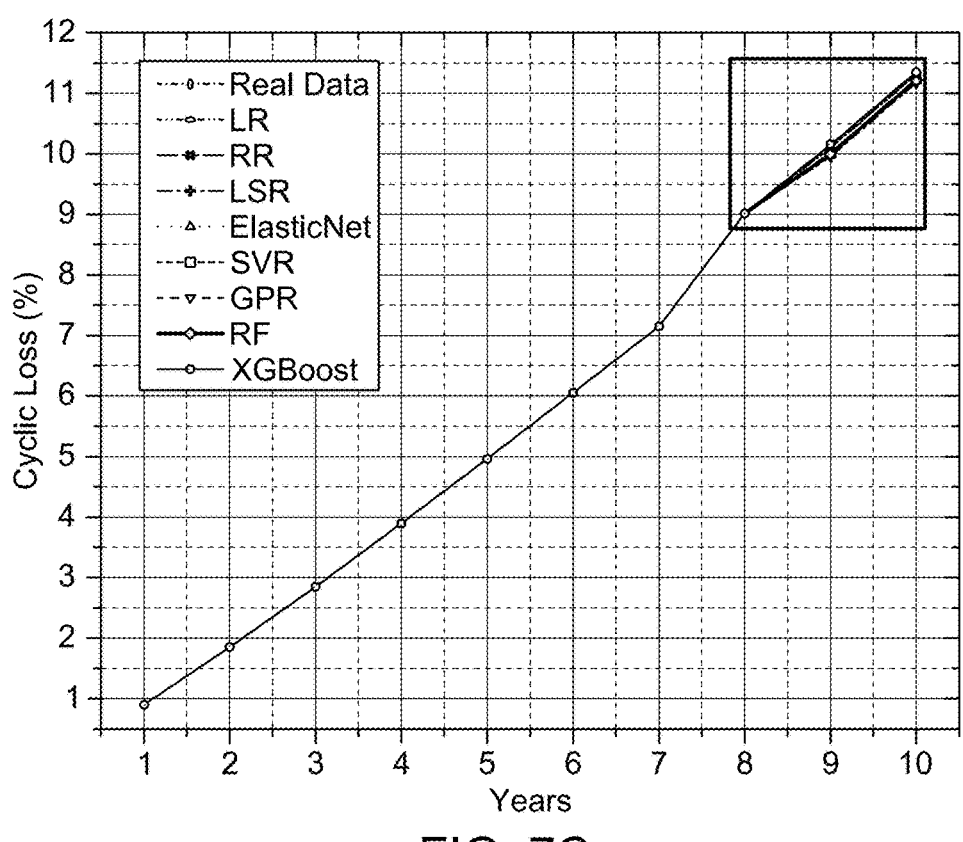
FIG. 7C is an exemplary graph of SFS based ML battery cyclic loss prediction in the US state of Arkansas, according to certain embodiments.
Figure 7D:
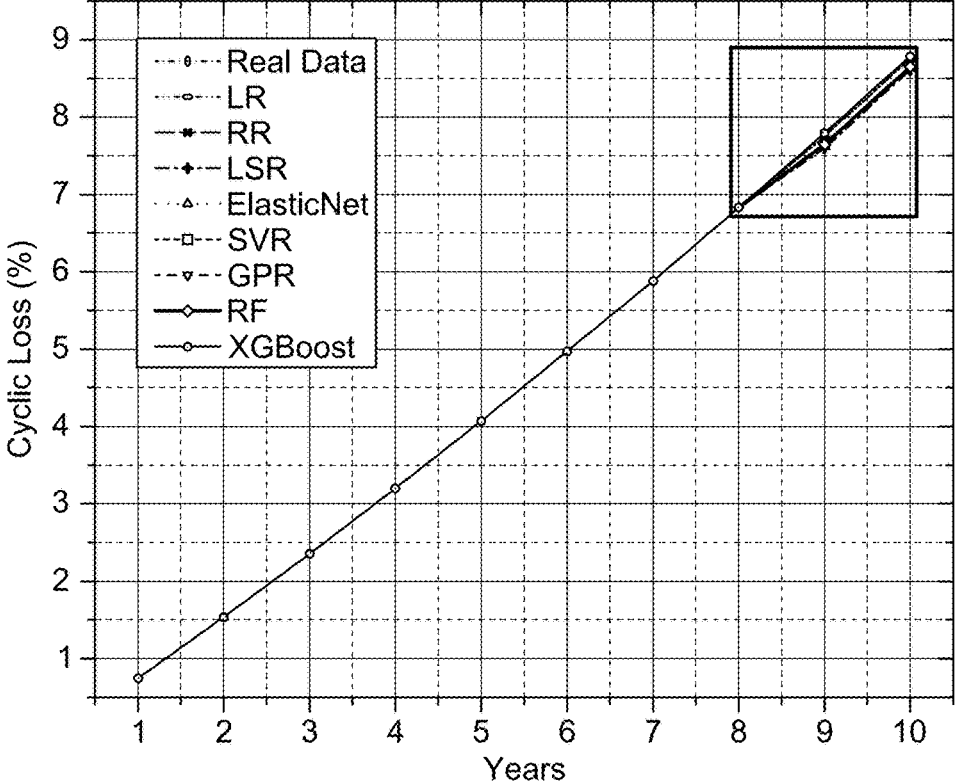
FIG. 7D is an exemplary graph of SFS based ML battery cyclic loss prediction in the US state of Arizona, according to certain embodiments.
Figure 7E:
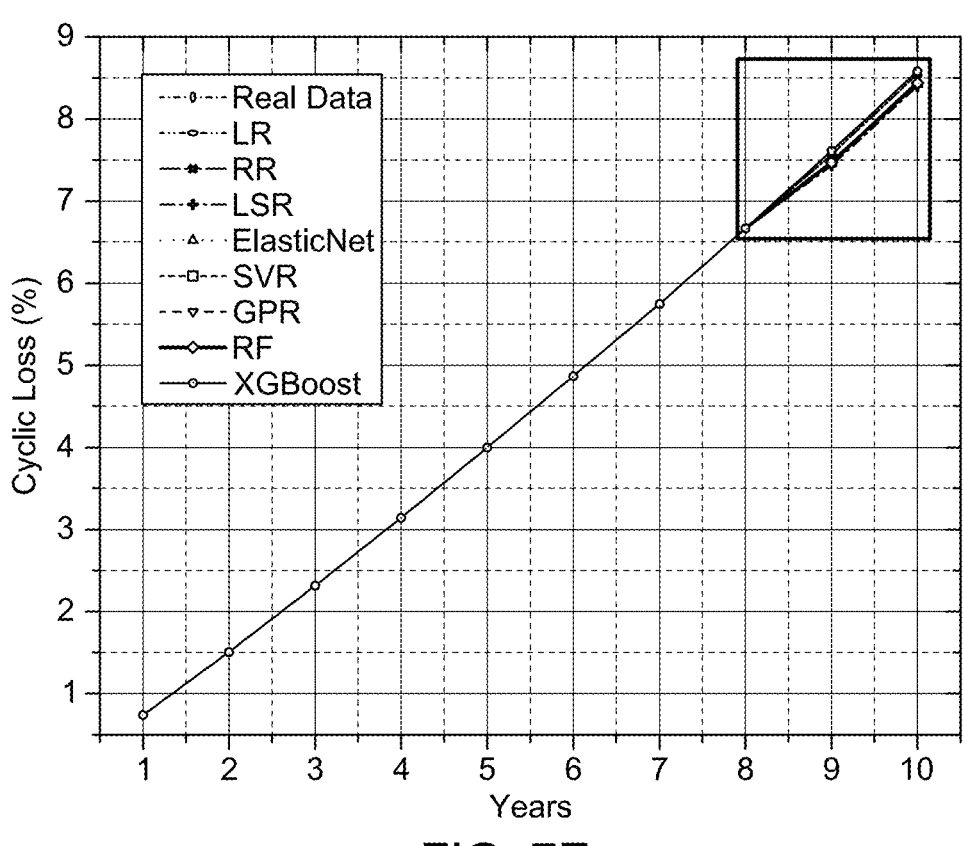
FIG. 7E is an exemplary graph of SFS based ML battery cyclic loss prediction in the US state of California, according to certain embodiments.

In the present disclosure, a real-world dataset related to the lithium-manganese oxide (LMO) graphite-based EV battery (generally, referred to as lithium-ion battery (LIB)) and its battery usage has been considered and investigated. LMO-graphite battery is extensively used in EVs such as the Nissan Leaf and the Chevrolet Volt. In the dataset under consideration, an EV battery pack which includes 192 cells with an initial capacity of 24.15 kWh is considered and the average voltage of each battery cell is 3.7 V, operating between 3.4V and 4.1V. The dataset consists of ten years of EV battery degradation data for the LMO-graphite battery, incorporating both cycle and calendar loss of an EV battery in each US state. The dataset comprises parameters that are related to EV battery usage and capacity degradation in each US state under different driving patterns and temperatures. For the current experiment, the data of five US states which includes California (CA), Arizona (AZ), Alaska (AL), Arkansas (AR), and Alabama (AL) is considered for evaluation from the dataset under consideration. The dataset contains the battery cyclic loss and calendar loss percentage of the EV under the average driving conditions for each of the five US states of ten years as illustrated in FIGS. 5 and 6. The dataset also includes a monthly-hourly timescale of ambient temperature and separated travel demands for local and highway driving conditions. In addition, the driving factors in the dataset consist of the annual charging/discharging cycle number, which is dependent on the yearly travel demand and the driving range of the EV, variations in discharging rates relative to the power outputs required from the battery pack under different driving speeds of the EV, and the varying temperatures to which the battery is exposed all year round.

LIBs on board EVs undergo both cycling capacity loss and calendar capacity loss. The cyclic and calendar loss is used to obtain the annual capacity loss in each state. In order to precisely calculate the battery capacity loss in each state of the US, a comprehensive battery capacity loss model is used. The cycling capacity loss takes place during the EV charge-discharge cycles, which can be calculated by the following equation:

$$CL_{cyc} = \frac{\sum_{m-1}^{C} I(t_m - t_{m+1})}{I \times t_1} \qquad (23)$$

where C is the charge-discharge cycle numbers of EV battery required in one year to meet the travel demand, I is the average charging current density, and tm is the time needed to get the EV battery fully charged in mth cycle. The annual EV charge-discharge cycles are calculated using the National Oceanic and Atmospheric Administration (NOAA) data on the US monthly hourly local temperature distribution. It can be calculated by the following equation:

$$C = \sum_{n=1}^{12} \sum_{h=1}^{24} C_{n,h} \qquad (24)$$

where Cn,h is state-level monthly hourly EV charge-discharge cycles, which is given as:

$$C_{n,h} = \frac{D_{n,h}}{R(T)} \qquad (25)$$

R(T) is the temperature-dependent EV driving range, which represents different load conditions needed by EV sub-systems and vehicle internal losses, T is the monthly hourly temperature, and Dn,h is the monthly hourly travel demand. The driving range of EVs is largely dependent on the EV driving conditions. In this experiment, the actual testing data of Nissan Leaf is used. The data is fitted to calculate the EV driving range under various temperatures which correspond to the actual driving range data of 2013 and 2014 Nissan Leaf models collected by FleetCarma. The driving range, R(T) is given by following equation:

$$R(T) = -1.182 \times 10 - 4 \times T^4 + \tag{26}$$

$$3.754 \times 10 - 5 \times T^3 + 0.087 \times T^2 + 2.838 \times T + 111.542$$

The calendar capacity loss takes place during battery energy storage and is mainly caused by battery self-discharge and side reactions. The battery calendar capacity loss follows Arrhenius-form kinetics, and an empirical expression based on the experimental data is formulated as:

$$CL_{cal} = 14876 \times \exp\left(\frac{E_a}{RT}\right)\psi_d(t_h)^{0.5} \tag{27}$$

where CLcal is the percentage of calendar capacity loss, $E_a$ is the activation energy i.e. Ea=24.5 kJ, R is the gas constant, $\psi_d$ is the time adjustment function, th stands for hour.

Data Pre-Processing and Feature Selection

The data under consideration has been pre-processed by converting, normalizing, and combining the selection of feature values of previous and current time intervals, which corresponds to each target value of battery cyclic and calendar loss value. The data has been processed for datasets given a time length of ten years. The SFS method extracts cyclic and calendar loss indicators from the dataset. Yearly features with one value of each feature per year are selected. The mean of the respective feature value fills in missing values. Based on the quantitative correlation analysis, cyclic and calendar loss indicators that have a strong relationship with the practical battery cyclic and calendar loss, respectively, are adopted as the feature inputs to the model.

Based on the disclosed SFS method, a full set of 33 feature parameters is generated for the battery cyclic and calendar loss prediction which includes the previous time interval's cyclic and calendar loss and all the input features of the previous and current time interval. The 33 features are classified according to their extraction sources and techniques to reflect the battery cyclic and calendar ageing dynamics from different perspectives as listed in Table 1. The problem under study is a small-sample-size application with a total experimental dataset of only a few battery samples. Excessive features may cause prediction models to overfit. Furthermore, some of the retrieved features may be redundant, resulting in poor model performance. Given this case, SFS must be applied to the entire feature collection to generate a feature subset selection. All these input features are used to predict the current year's cyclic and calendar loss which is accounted for as an output label.

TABLE 1

SFS based features for battery cyclic and calendar loss prediction

| Feature Type | No. | Feature Description |
|---|---|---|
| Distance | F1 | Local distance travelled in previous time step |
| | F2 | Local distance travelled in current time step |
| | F3 | Highway distance travelled in previous time step |

TABLE 1-continued

SFS based features for battery cyclic and calendar loss prediction

| Feature Type | No. | Feature Description |
|---|---|---|
| | F4 | Highway distance travelled in current time step |
| | F5 | Total distance travelled annually in previous year |
| | F6 | Total distance travelled annually in current year |
| Charging | F7 | Internal resistance while charging for previous time step |
| | F8 | Internal resistance while charging for current time step |
| | F9 | Charging efficiency for previous time step |
| | F10 | Charging efficiency for current time step |
| Discharging | F11 | Internal resistance while discharging for previous time step |
| | F12 | Internal resistance while discharging for current time step |
| | F13 | Discharging efficiency for previous time step |
| | F14 | Discharging efficiency for current time step |
| Energy consumption | F15 | Energy Consumption per charge for previous time step |
| | F16 | Energy Consumption per charge for previous time step |
| | F17 | Energy Consumption considering per travel demand for previous time step |
| | F18 | Energy Consumption considering per travel demand for current time step |
| | F19 | Energy Consumption considering battery degradation for previous time step |
| | F20 | Energy Consumption considering battery degradation for current time step |
| Temperature | F21-F32 | Average monthly temperature for month 1 to 12 |
| Cyclic/ Calendar loss | F33 | Cyclic/Calendar loss for previous time step |

Results and Discussions

SFS method is applied to the dataset to obtain a feature set of 33 features which are selected based on 13 reference measurements of the cyclic and calendar loss dataset. To evaluate the effectiveness and performance of the SFS method, the derived feature subset is used with the ML algorithms to predict the battery capacity loss. The training and testing data are split into the ratio of 80% and 20%, respectively. The training model trains to predict the current year battery cyclic and calendar loss using the extracted features while the testing process validates the performance of the battery cyclic and calendar loss prediction model. The features obtained from the SFS method are used for battery cyclic and calendar loss prediction with the ML algorithms like the Linear Regression (LR), Ridge Regression (RR), Lasso Regression (LSR), Support Vector Regression (SVR), Gaussian Process Regression (GPR), Random Forest Regression (RF), ElasticNet Regression, XGBoost.

Table 2 tabulates the average MAE results of battery cyclic loss for all of the ML methods applied to the testing data by applying the SFS method, while Table 3 demonstrates the average MAE of predicted calendar loss for all the ML methods by applying the SFS method. To explore the impact of SFS on ML prediction models, the performance of the SFS method is compared with the conventional feature selection approach for battery cyclic loss as shown in Table 2 below.

TABLE 2

MAE comparison of the ML methods using the conventional
and disclosed feature selection for cyclic loss

| Model | Conventional Feature Selection | SFS | Improvement (%) |
|---|---|---|---|
| Linear Regression | 0.029 | 0.023 | 20.68% |
| Ridge Regression | 0.044 | 0.038 | 13.63% |
| Lasso Regression | 0.213 | 0.193 | 9.38% |
| SVR | 0.035 | 0.022 | 37.14% |
| GPR | 0.027 | 0.014 | 48.14% |
| RF | 0.018 | 0.010 | 44.44% |
| ElasticNet | 0.213 | 0.154 | 27.69% |
| XGBoost | 0.023 | 0.011 | 52.17% |

FIGS. 7A-7E illustrate the SFS-ML based battery cyclic prediction results in the US states of Alaska, Alabama, Arkansas, Arizona, and California, respectively. The predictions results of the SFS based ML framework are depicted and compared for the last two years of battery cyclic loss data as the first eight years of battery data is designated for training, while last two years of EV battery cyclic loss data is used for testing. The cyclic loss predictions results of the SFS based ML framework are highlighted as rectangular areas in FIGS. 7A-7E.

Figure 8:
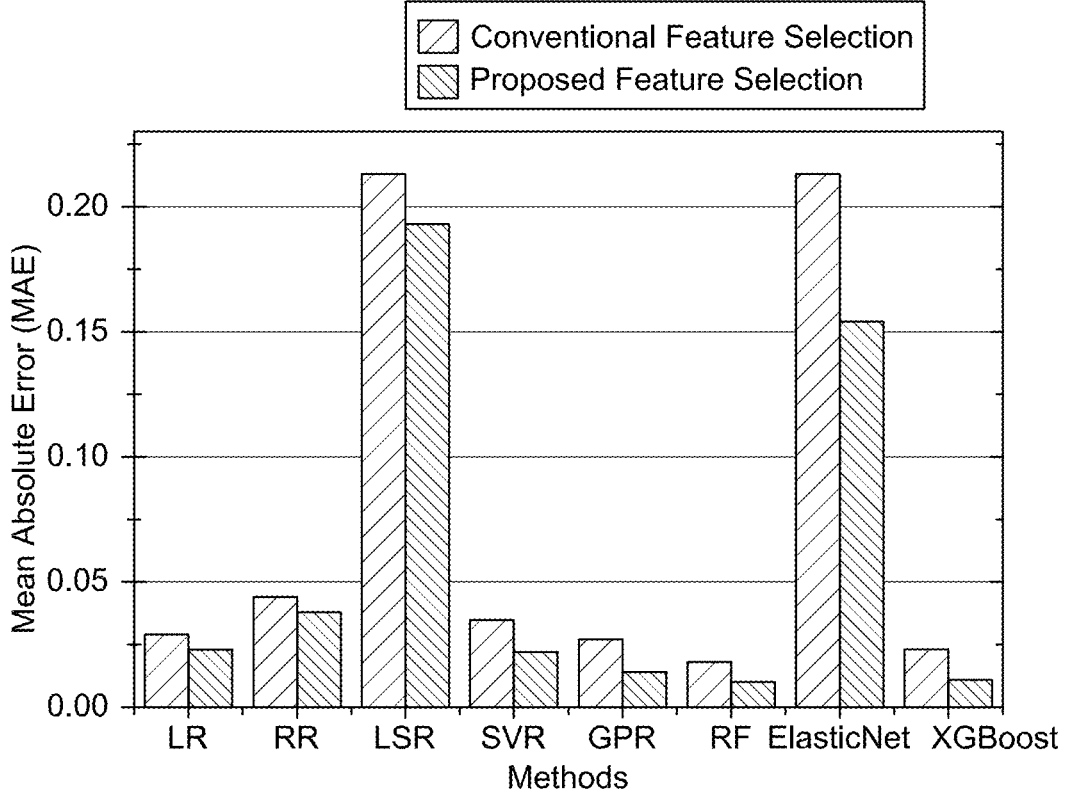
FIG. 8 is an exemplary graph of accuracy performance of ML models used with the SFS algorithm for predicting battery cyclic loss, according to certain embodiments.
Figure 9:
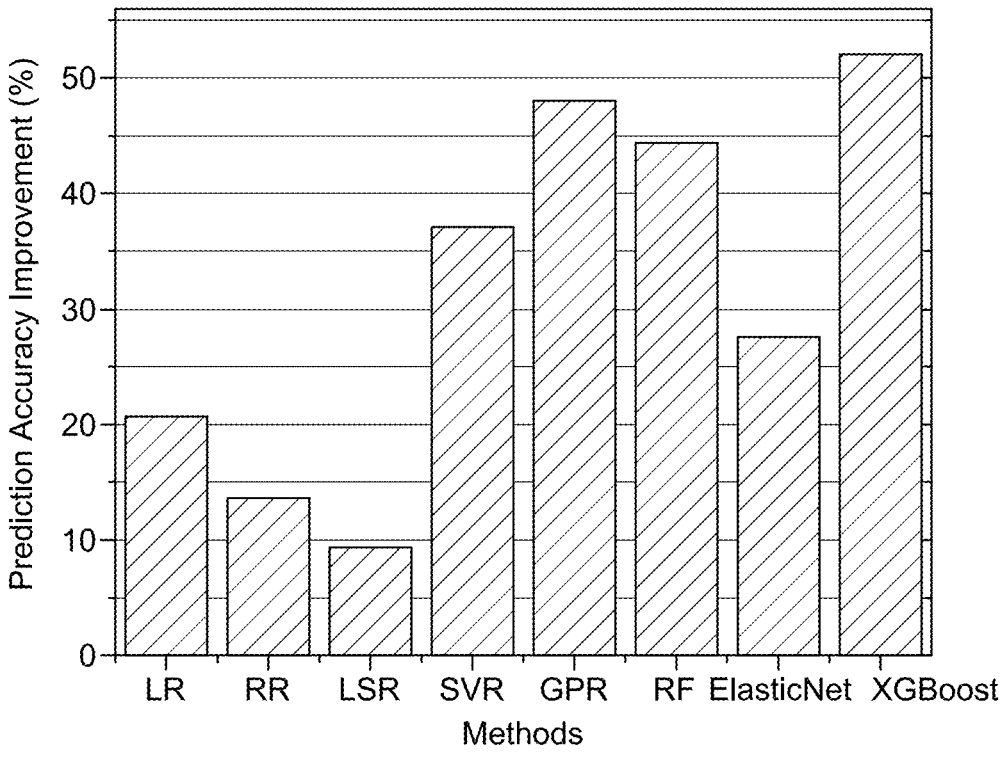
FIG. 9 is an exemplary graph of percentage improvement of the SFS algorithm over conventional feature selection for battery cyclic loss prediction, according to certain embodiments.
Figure 10A:
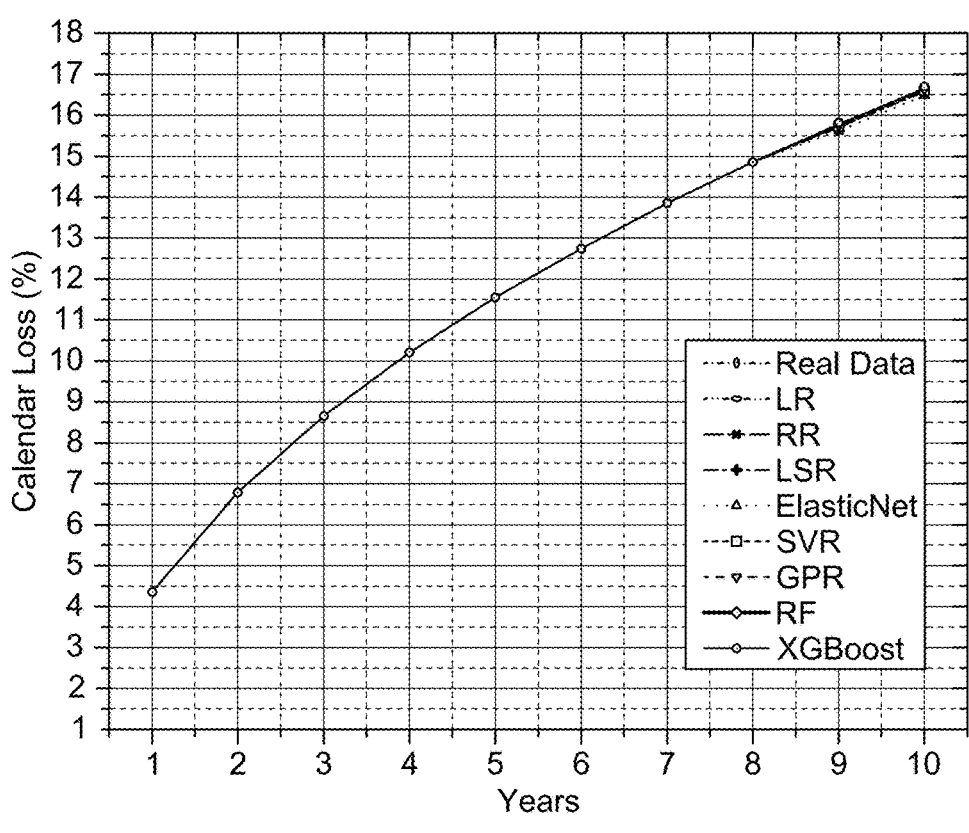
FIG. 10A is an exemplary graph of SFS-ML based battery calendar loss prediction in the US states of Alaska, according to certain embodiments.
Figure 10B:
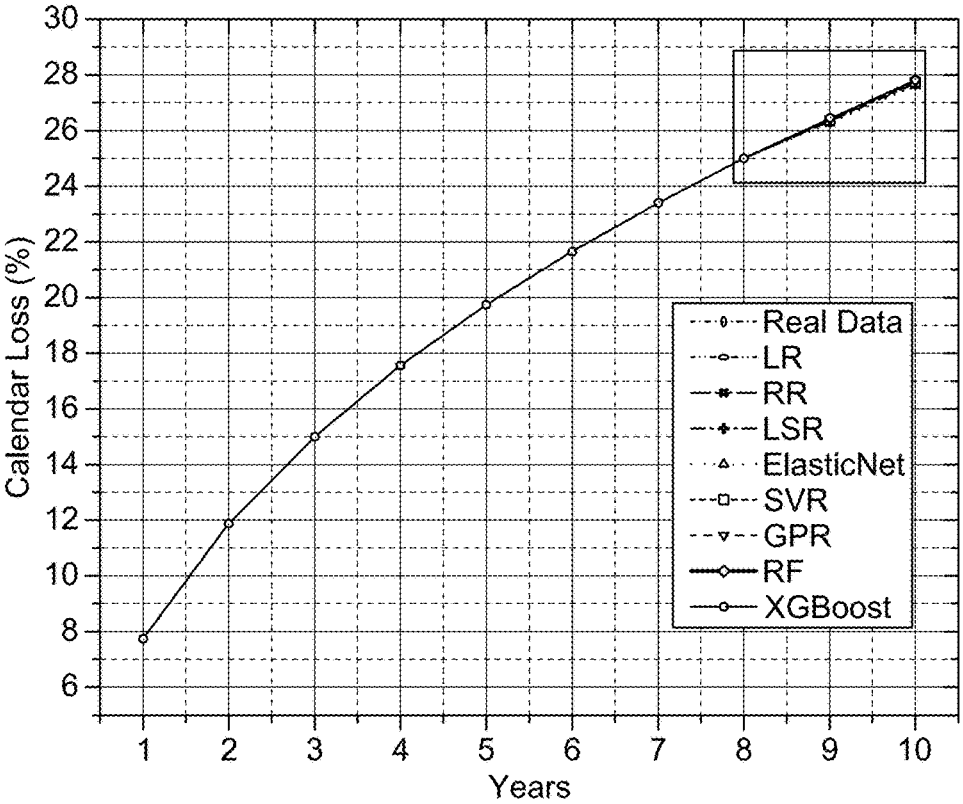
FIG. 10B is an exemplary graph of SFS-ML based battery calendar loss prediction in the US states of Alabama, according to certain embodiments.
Figure 10C:
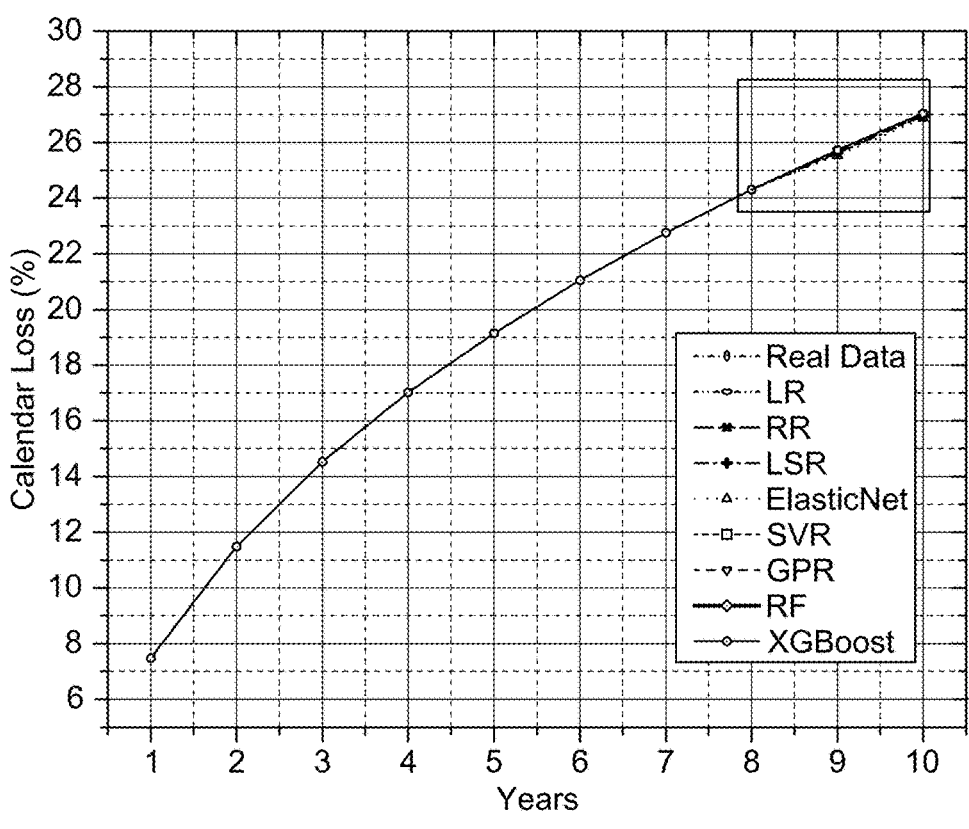
FIG. 10C is an exemplary graph of SFS-ML based battery calendar loss prediction in the US states of Arkansas, according to certain embodiments.
Figure 10D:
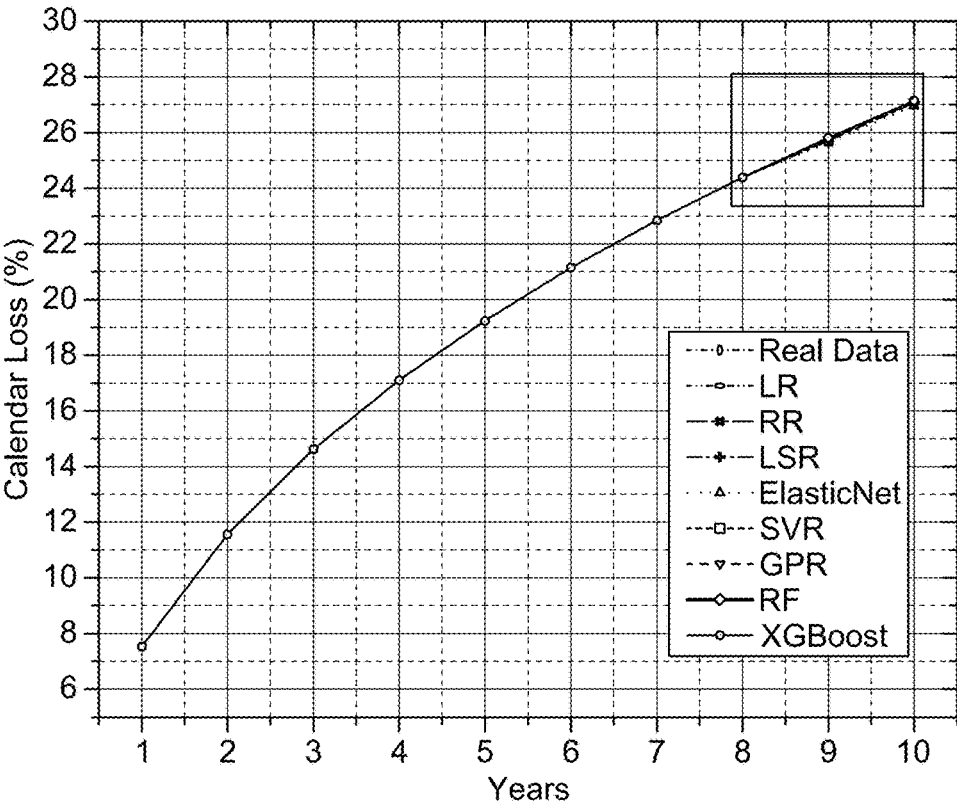
FIG. 10D is an exemplary graph of SFS-ML based battery calendar loss prediction in the US states of Arizona, according to certain embodiments.
Figure 10E:
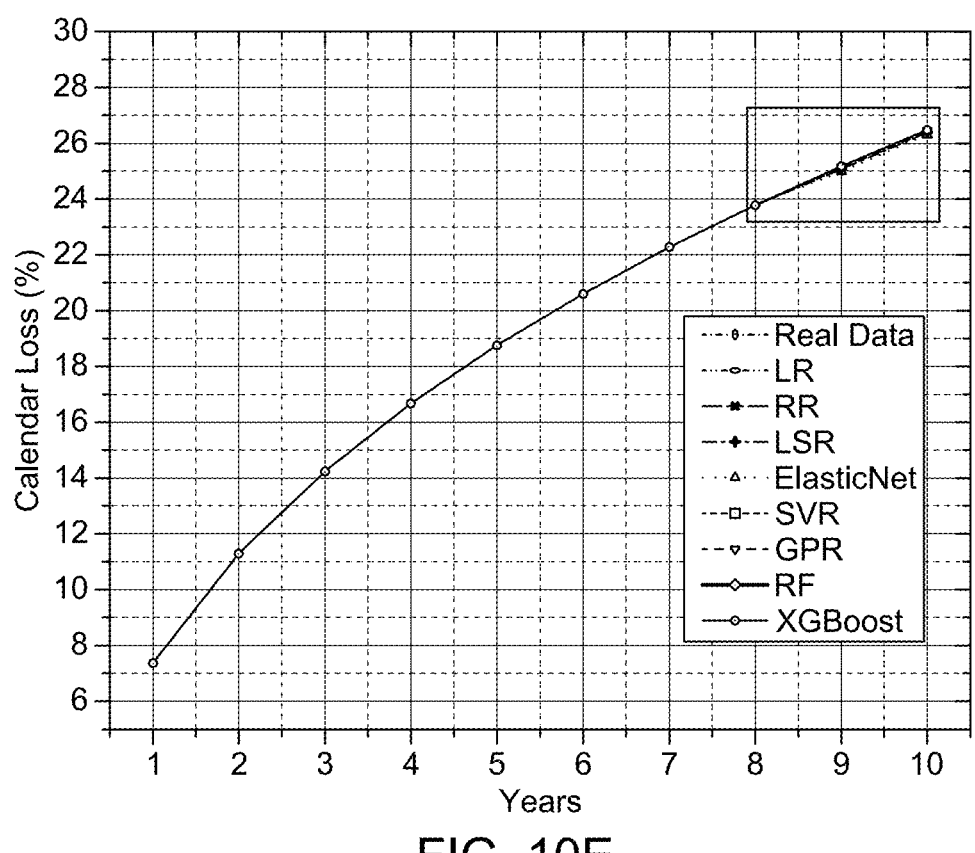
FIG. 10E is an exemplary graph of SFS-ML based battery calendar loss prediction in the US states of California, according to certain embodiments.

MAE evaluation results of ML algorithms for SFS and conventional feature selection are shown in FIG. 8 while the percentage improvement in the prediction accuracy of the battery cyclic loss with the utilization of the SFS method is represented in FIG. 9. It is observed that the performance accuracy of ML methods has improved with the SFS approach, and the highest improvement percentage in prediction accuracy is stated for XGBoost, and GPR which are 52.17%, and 48.14%, respectively. In addition, by applying SFS, RF and SVR algorithms, there is a respective performance improvement of 37.14% and 44.44% in the prediction accuracy. RF and XGBoost methods using features selected by the SFS method affords the best predictive performance for battery cyclic loss prediction with the MAE of 0.010, and 0.011, respectively. For battery cyclic loss prediction using conventional feature selection and the SFS method, RF, XGBoost, SVR and GPR outperform the other ML models as they show the lowest MAE. This may be due to the fact that they are simpler than the other ML models and hence more generalized to the small-sample-size problem. Furthermore, when all the 33 features obtained using the SFS method are used as input to the ML algorithms, prediction results depict an improvement which demonstrates that the SFS method enhances the prediction accuracy of each ML model.

FIGS. 10A-10E depict the SFS based ML battery calendar prediction results in the US states of Alaska, Alabama, Arkansas, Arizona, and California, respectively. Similar to the battery cyclic prediction results, the first eight years of battery data are used for training, while last two years of EV battery cyclic loss data is used for testing. The calendar loss predictions results of the SFS based ML framework are depicted and compared for the last two years of battery calendar loss data which is highlighted as rectangular areas in FIGS. 10A-10E.

Table 3 below tabulates the MAE of the prediction results of battery calendar loss for the ML methods applied to the testing data by incorporating the SFS method. To explore the impact of SFS on ML prediction models, the performance of the SFS method is compared with the conventional feature extraction approach in terms of accuracy and performance for battery calendar loss prediction. It is observed that the XGBoost, and RF outperform the other ML models for both conventional feature selection and the disclosed SFS method as they show the lower MAE of 0.008, and 0.016 respectively.

XGBoost showed better accuracy than RF and GPR while predicting the battery capacity loss with the SFS method. XGBoost is a sequential model, which means that each subsequent tree is dependent on the outcome of the last. XGBoost aggregates the results of each decision tree along the way to calculate the final result and does not aggregate the results at the end of the process. In addition, when features obtained from the SFS method are taken as input to the ML algorithms an improvement in the prediction accuracy is observed indicating that the SFS enhance the predictive ability of each ML. Table 3 also depicts that the ElasticNet algorithm showed the least improvement in the prediction results through the SFS as the calendar loss output values and corresponding input features selected through the SFS method do not have a very high correlation, which compels the ElasticNet algorithm to choose the entirety of input variables and does not shrink the coefficients. The grouping effect does not take place effectively in such cases as variables cannot be easily identified using the low correlation.

TABLE 3

MAE Comparison of the ML methods using the conventional
and disclosed feature selection for calendar loss

| Model | Conventional Feature Selection | SFS | Improvement (%) |
|---|---|---|---|
| Linear Regression | 0.059 | 0.027 | 54.23% |
| Ridge Regression | 0.054 | 0.028 | 48.14% |
| Lasso Regression | 0.239 | 0.073 | 69.45% |
| SVR | 0.072 | 0.048 | 33.33% |
| GPR | 0.081 | 0.036 | 55.55% |
| RF | 0.031 | 0.016 | 48.38% |
| ElasticNet | 0.201 | 0.186 | 7.46% |
| XGBoost | 0.029 | 0.008 | 72.41% |

Figure 11:
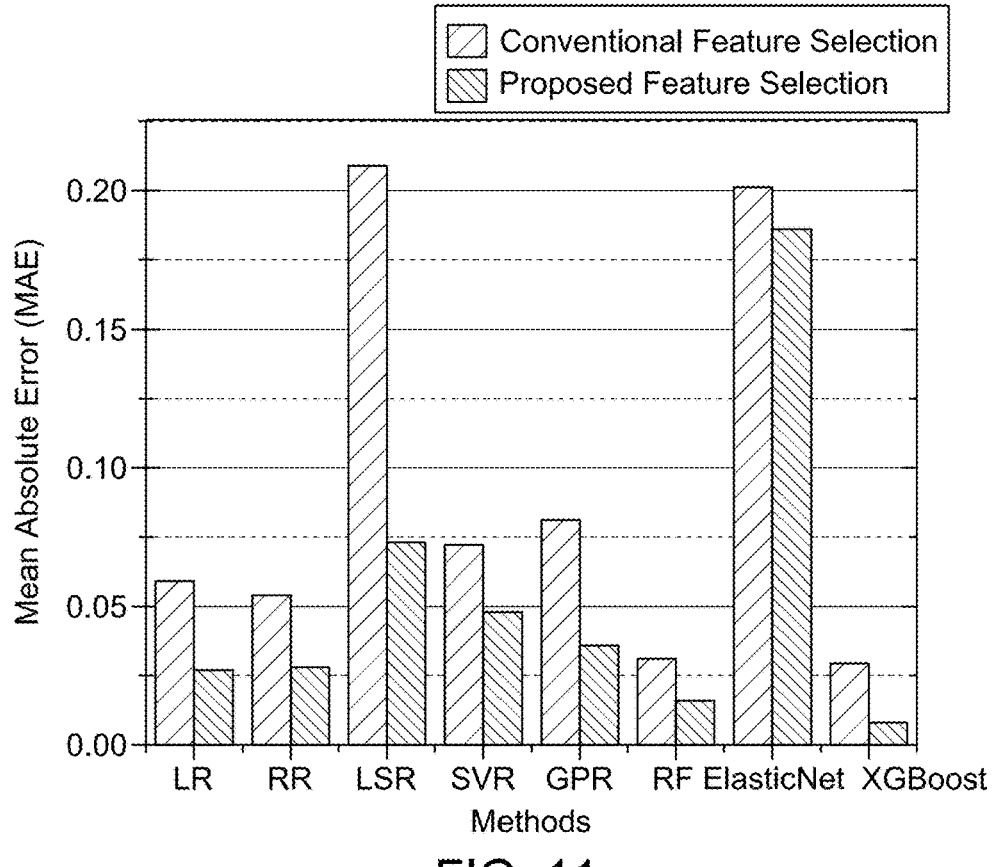
FIG. 11 is an exemplary graph of accuracy performance of ML models used with the SFS algorithm for predicting battery calendar loss, according to certain embodiments.
Figure 12:
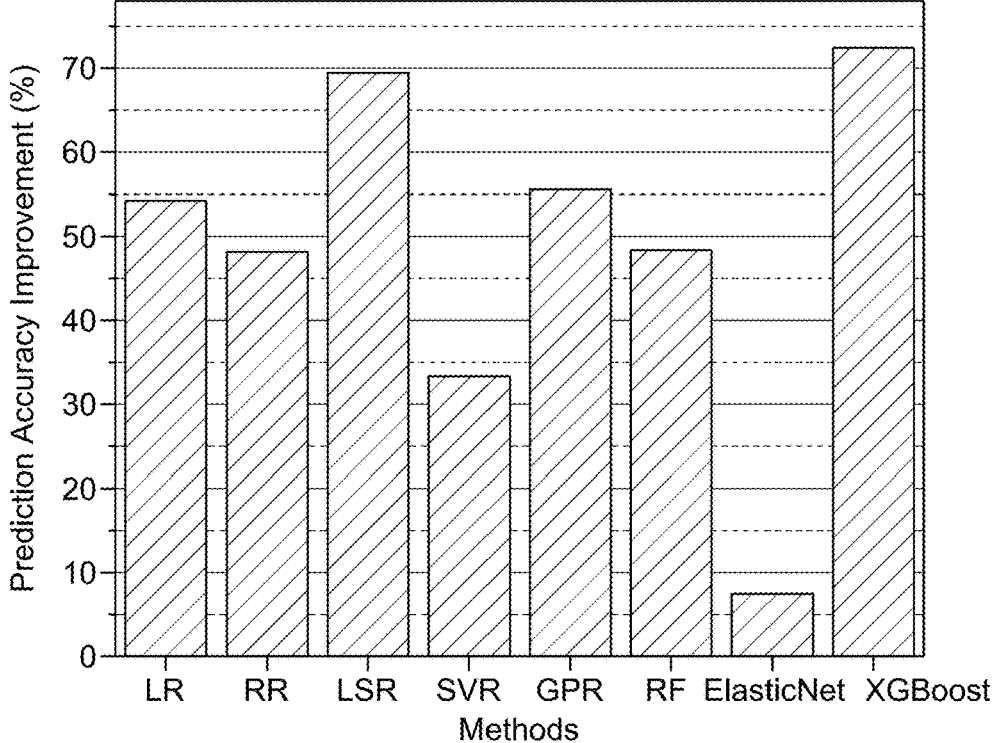
FIG. 12 is an exemplary graph of percentage improvement of the SFS algorithm over conventional feature selection for battery calendar loss prediction, according to certain embodiments.

The MAE evaluation results of ML algorithms for SFS and conventional feature selection are compared and depicted in FIG. 11 while the percentage improvement in the prediction accuracy of the battery calendar loss with the utilization of the SFS method is represented in FIG. 12. It is observed that the performance accuracy of ML methods for battery calendar loss prediction has improved with the SFS approach, and the greater improvement percentage in prediction accuracy is stated for XGBoost, LASSO regression, GPR and linear regression which is 72.41%, 69.45%, 55.55%, and 54.23%, respectively. In addition, by applying SFS, RF and SVR algorithms have shown respective performance improvements of 48.38% and 33.33% in prediction accuracy. Using the SFS method, XGBoost and RF methods depict the best predictive performance for battery calendar loss prediction with the MAE of 0.008, and 0.016, respectively. It is also observed that without taking the past output label as the feature, the error is greater as compared to when the past output label is taken as an input feature, which leads to smaller accumulated errors over time. As shown in Table 2 and 3, compared with the RF and XGBoost, the performance accuracy of the SVR and the GPR is relatively low. Based on the overall results, the RF and XGBoost have the best predictive performance in terms of both battery cyclic and calendar loss prediction accuracy, as they have the lowest MAE. It is evident that the performance accuracy of ML methods has improved with the SFS approach.

Accurate prediction of the battery capacity degradation could effectively enhance the safety and reliability of Li-ion batteries. ML draws a significant role in battery capacity loss prediction and degradation modelling. It has the potential to be widely applied in future EVs. Based on the utilization of the data pre-processing methods and ML algorithms, the present disclosure presents a smart feature selection (SFS) method to extract characteristic input parameters for battery cyclic and calendar loss prediction, which plays an important role in battery capacity loss and degradation modelling. While devising a battery cyclic and calendar loss prediction model, appropriate indicators are selected as model inputs. The characteristic features for calendar and cyclic loss prediction are comprehensively extracted based on the intensive utilization of the SFS method on the battery datasets by coupling present and historical features. ML algorithms are applied in combination with the SFS method on the processed data to predict calendar and cyclic loss using the extracted features. The model trains on the designated training data while the testing process validates the performance of the prediction model.

A case study is performed on a diverse and dynamic EV dataset in the United States, where 33 features are extracted using the disclosed feature selection method. It is worth mentioning that the features are extracted based on 13 reference measurements during the cyclic and calendar loss process mentioned in the dataset. The methodology is assessed using eight widely ML algorithms for battery cyclic and calendar loss prediction. The results depict that the disclosed SFS method has improved the prediction accuracy and reduced the MAE for all the ML algorithms applied in the present disclosure. The highest improvement in prediction accuracy for the calendar is shown for XGBoost, GPR, and RF algorithm, which is 52.17%, 48.14%, and 44.44%, respectively. For calendar loss prediction, a significant improvement of 72.41%, 48.38%, and 33.33% is also depicted by XGBoost, GPR, and SVR algorithms when applied in combination with the SFS methods. The results also show that RF and XGBoost methods when applied with the disclosed SFS method, have shown a higher accuracy for the battery capacity loss prediction.

The method and the system (i.e., the battery health management system) of the present disclosure provide significant improvements over existing battery degradation modeling techniques. By integrating a smart feature selection (SFS) strategy with advanced ML algorithms, the present disclosure achieves higher prediction accuracy and reduced mean absolute error in battery capacity loss estimation. The present disclosure effectively addresses the challenges posed by the complex, nonlinear behavior of battery degradation, offering a more reliable and efficient tool for battery health management in EVs. The use of historical and current operational data to inform the prediction model enables a dynamic and adaptable approach, enhancing applicability of the ML model to real-world conditions.

Figure 13:
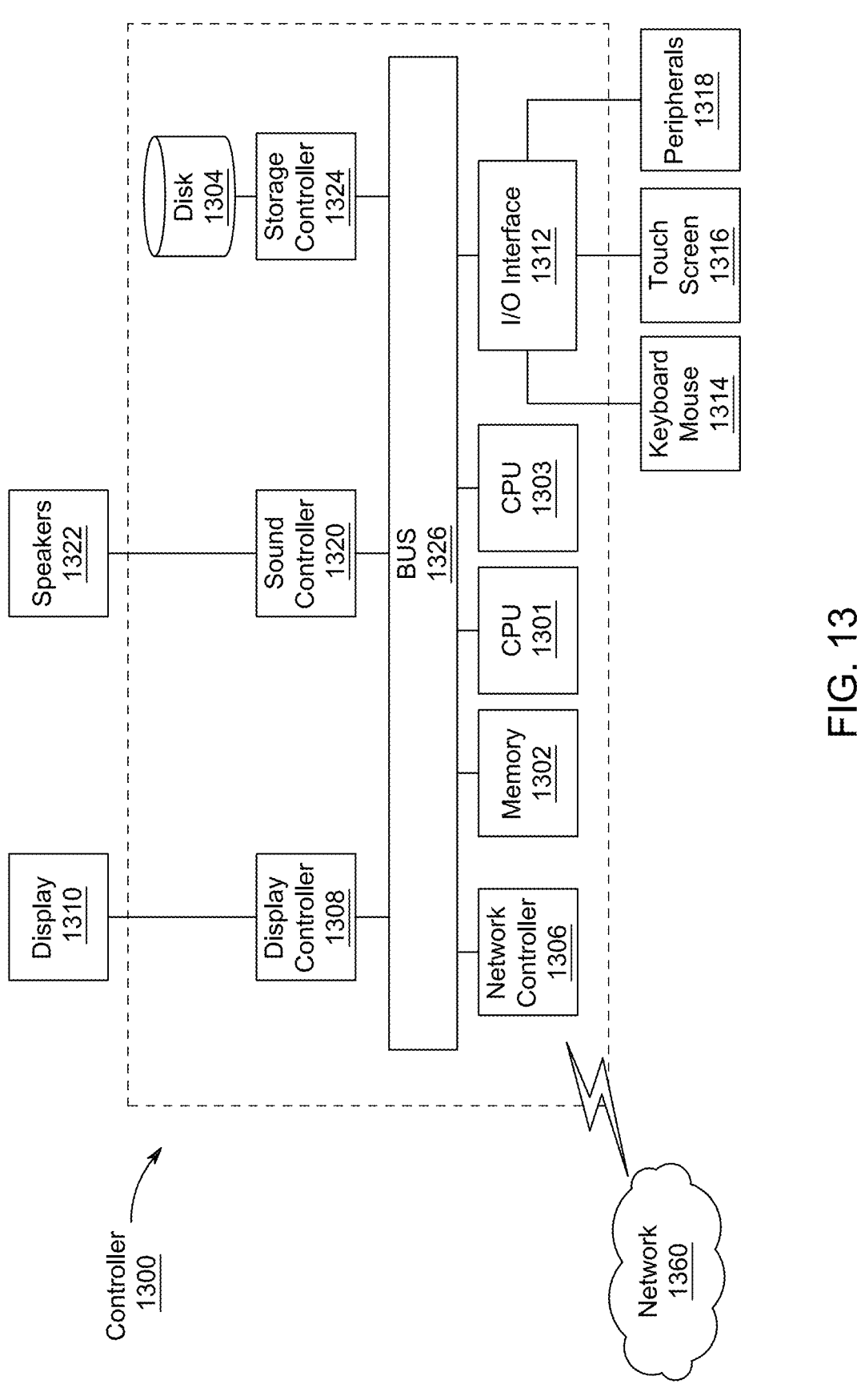
FIG. 13 is an illustration of a non-limiting example of details of computing hardware used in the computing system, according to certain embodiments.

Next, further details of the hardware description of the computing environment according to exemplary embodiments is described with reference to FIG. 13. In FIG. 13, a controller 1300 is described as representative of the battery health management system, in which the controller 1300 is a computing device which includes a CPU 1301 which performs the processes described above/below. The process data and instructions may be stored in memory 1302. These processes and instructions may also be stored on a storage medium disk 1304 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1301, 1303 and an operating system such as Microsoft Windows 7, Microsoft Windows 8, Microsoft Windows 10, UNIX, Solaris, LINUX, Apple MAC-OS, and other systems known to those skilled in the art.

The hardware elements in order to achieve the computing device may be realized by various circuitry elements, known to those skilled in the art. For example, CPU 1301 or CPU 1303 may be a Xenon or Core processor from Intel of America or an Opteron processor from AMD of America, or may be other processor types that would be recognized by one of ordinary skill in the art. Alternatively, the CPU 1301, 1303 may be implemented on an FPGA, ASIC, PLD or using discrete logic circuits, as one of ordinary skill in the art would recognize. Further, CPU 1301, 1303 may be implemented as multiple processors cooperatively working in parallel to perform the instructions of the inventive processes described above.

The computing device in FIG. 13 also includes a network controller 1306, such as an Intel Ethernet PRO network interface card from Intel Corporation of America, for interfacing with network 1360. As can be appreciated, the network 1360 can be a public network, such as the Internet, or a private network such as an LAN or WAN network, or any combination thereof and can also include PSTN or ISDN sub-networks. The network 1360 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1308, such as a NVIDIA GeForce GTX or Quadro graphics adaptor from NVIDIA Corporation of America for interfacing with display 1310, such as a Hewlett Packard HPL2445w LCD monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners, such as an OfficeJet or DeskJet from Hewlett Packard.

A sound controller 1320 is also provided in the computing device such as Sound Blaster X-Fi Titanium from Creative, to interface with speakers/microphone 1322 thereby providing sounds and/or music.

The general purpose storage controller 1324 connects the storage medium disk 1304 with communication bus 1326, which may be an ISA, EISA, VESA, PCI, or similar, for interconnecting all of the components of the computing device. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 14.

Figure 14:
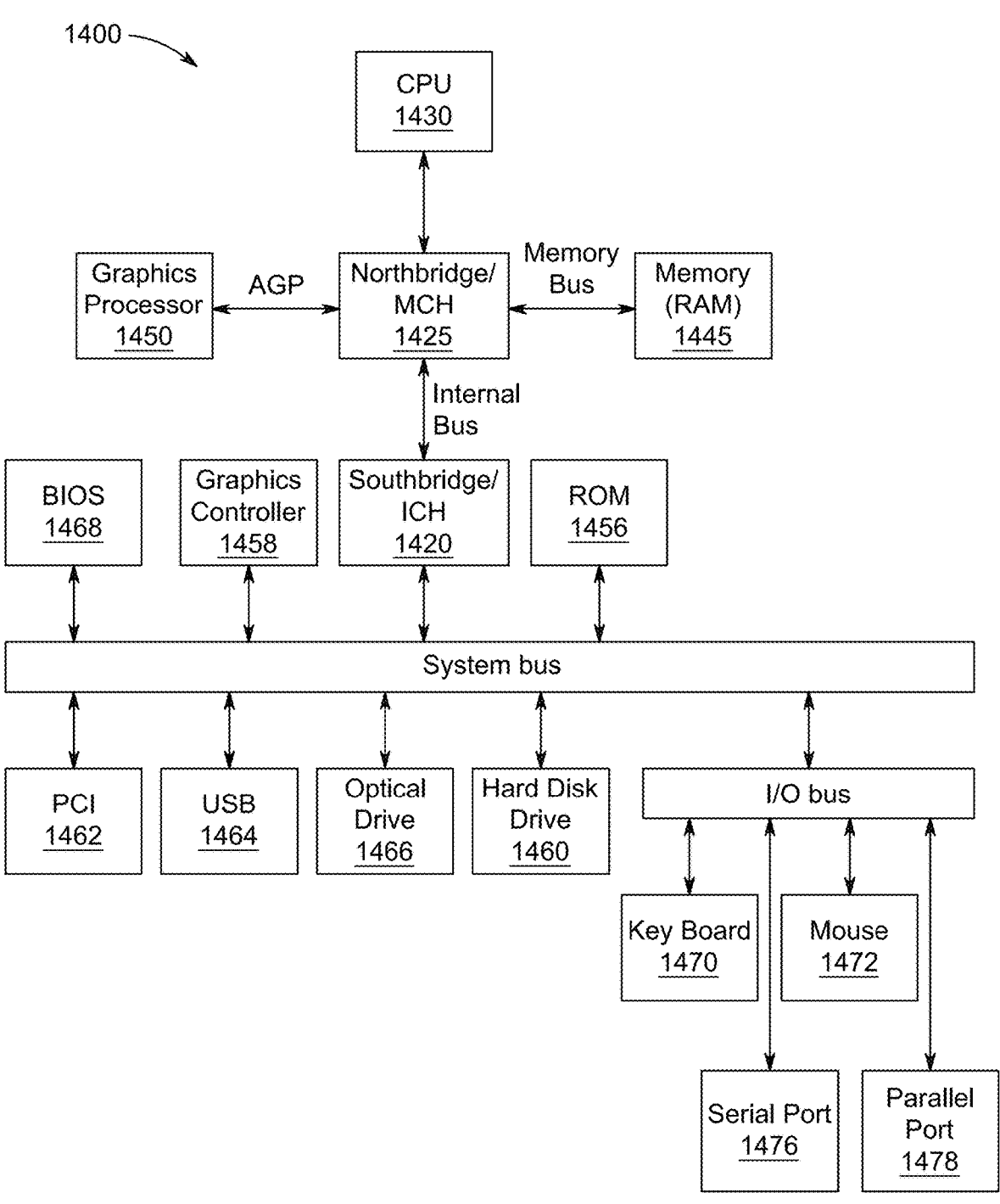
FIG. 14 is an exemplary schematic diagram of a data processing system used within the computing system, according to certain embodiments.

FIG. 14 shows a schematic diagram of a data processing system, according to certain embodiments, for performing the functions of the exemplary embodiments. The data processing system is an example of a computer in which code or instructions implementing the processes of the illustrative embodiments may be located.

In FIG. 14, data processing system 1400 employs a hub architecture including a north bridge and memory controller hub (NB/MCH) 1425 and a south bridge and input/output (I/O) controller hub (SB/ICH) 1420. The central processing unit (CPU) 1430 is connected to NB/MCH 1425. The NB/MCH 1425 also connects to the memory 1445 via a memory bus, and connects to the graphics processor 1450 via an accelerated graphics port (AGP). The NB/MCH 1425 also connects to the SB/ICH 1420 via an internal bus (e.g., a unified media interface or a direct media interface). The CPU Processing unit 1430 may contain one or more processors and even may be implemented using one or more heterogeneous processor systems.

Figure 15:
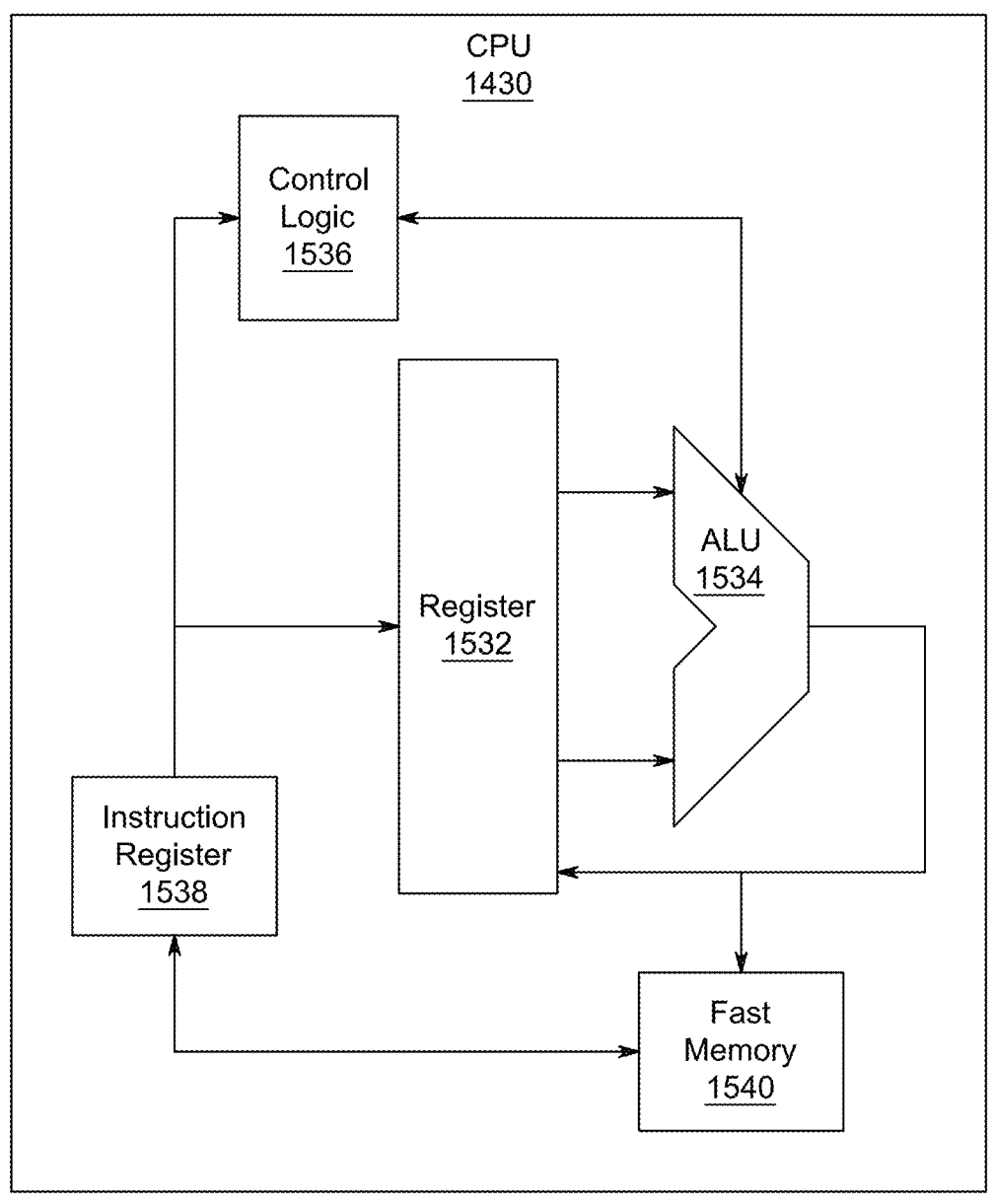
FIG. 15 is an exemplary schematic diagram of a processor used with the computing system, according to certain embodiments.

For example, FIG. 15 shows one implementation of CPU 1430. In one implementation, the instruction register 1538 retrieves instructions from the fast memory 1540. At least part of these instructions are fetched from the instruction register 1538 by the control logic 1536 and interpreted according to the instruction set architecture of the CPU 1430. Part of the instructions can also be directed to the register 1532. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1534 that loads values from the register 1532 and performs logical and mathematical operations on the loaded values according to the instructions. The results from these operations can be feedback into the register and/or stored in the fast memory 1540. According to certain implementations, the instruction set architecture of the CPU 1430 can use a reduced instruction set architecture, a complex instruction set architecture, a vector processor architecture, a very large instruction word architecture. Furthermore, the CPU 1430 can be based on the Von Neuman model or the Harvard model. The CPU 1430 can be a digital signal processor, an FPGA, an ASIC, a PLA, a PLD, or a CPLD. Further, the CPU 1430 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 14, the data processing system 1400 can include that the SB/ICH 1420 is coupled through a system bus to an I/O Bus, a read only memory (ROM) 1456, universal serial bus (USB) port 1464, a flash binary input/output system (BIOS) 1468, and a graphics controller 1458. PCI/PCIe devices can also be coupled to SB/ICH 1488 through a PCI bus 1462.

The PCI devices may include, for example, Ethernet adapters, add-in cards, and PC cards for notebook computers. The Hard disk drive 1460 and CD-ROM 1466 can use, for example, an integrated drive electronics (IDE) or serial advanced technology attachment (SATA) interface. In one implementation the I/O bus can include a super I/O (SIO) device.

Further, the hard disk drive (HDD) 1460 and optical drive 1466 can also be coupled to the SB/ICH 1420 through a system bus. In one implementation, a keyboard 1470, a mouse 1472, a parallel port 1478, and a serial port 1476 can be connected to the system bus through the I/O bus. Other peripherals and devices that can be connected to the SB/ICH 1420 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 16:
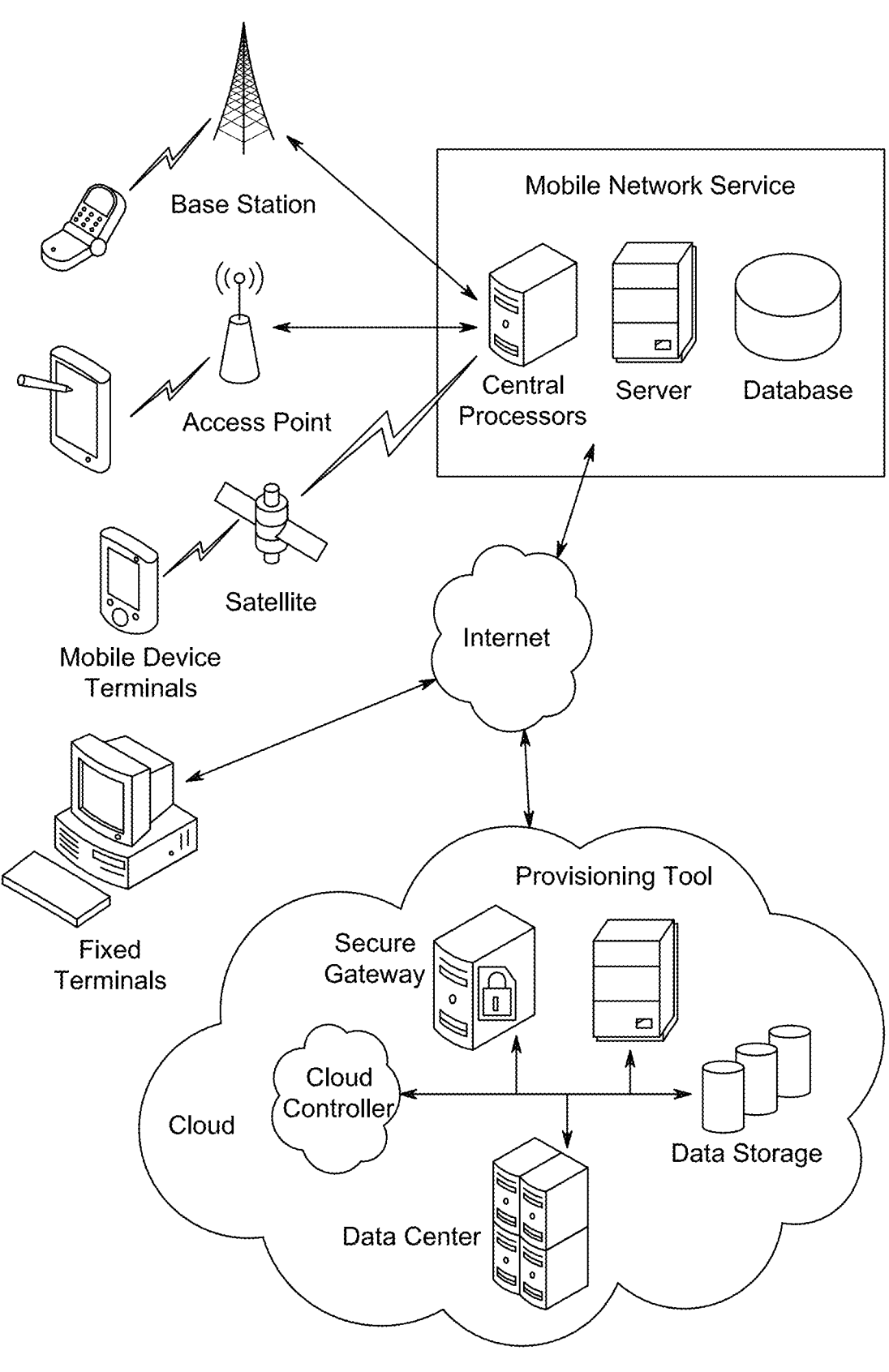
FIG. 16 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 16, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A computer-implemented method of predicting a battery capacity degradation for an electric vehicle having a battery, comprising:

extracting and pre-processing a raw dataset comprising a plurality of battery loss indicators and a plurality of battery loss values each corresponding to a plurality of time steps to obtain a pre-processed dataset;

selecting a loss indicator subset from the pre-processed dataset at a first time step and a second time step of the plurality of time steps based on a smart feature selection (SFS) algorithm, wherein the first time step is immediately prior to the second time step;

training a machine learning model with each battery loss indicator of the plurality of battery loss indicators in the loss indicator subset at the first and second time steps of the plurality of time steps and the battery loss value at the first time step; and determining the battery loss value at the second time step with the machine learning model to predict the battery capacity degradation;

wherein the plurality of battery loss values includes a battery cyclic loss value and a battery calendar loss value.

2. The method of claim 1, wherein the SFS algorithm comprises:

extrapolating the loss indicator subset to fill missing values in the pre-processed dataset;

extracting a mapping relationship between the plurality of battery loss indicators and the plurality of battery loss values from the pre-processed dataset at each time steps of the plurality of time steps based on a quantitative correlation analysis; and selecting one or more battery loss indicators from the plurality of battery loss indicators in the pre-processed dataset based on the mapping relationship to obtain the loss indicator subset.

3. The method of claim 1, wherein the plurality of battery loss indicators includes a distance travelled by an electronic vehicle having the lithium-ion battery, a charging efficiency of the lithium-ion battery, a discharging efficiency of the lithium-ion battery, an energy consumption at the first and second time steps, an internal resistance of the lithium-ion battery, and a temperature.

4. The method of claim 1, wherein the training further comprises:

splitting the loss indicator subset into a training data and a testing data;

training the machine learning model with the training data; and validating the machine learning model with the testing data.

5. The method of claim 4, wherein the machine learning model is selected from Linear Regression, Ridge Regression, Lasso Regression, Support Vector Regression, Gaussian Process Regression, Random Forest, ElasticNet, and XGBoost.

6. The method of claim 1, wherein the battery is a lithium-ion battery.

7. The method of claim 1, wherein the raw dataset includes a real-time data including a plurality of operating conditions obtained from the electric vehicle while operating.

8. A battery health management system to predict a battery capacity degradation for an electric vehicle having a battery, comprising:

a system processor communicatively connected to a vehicle control unit of the electric vehicle and configured to execute a program instruction; and a memory connected to the system processor and configured to store a raw data;

wherein the program instruction comprises:

extracting and pre-processing the raw dataset comprising a plurality of battery loss indicators and a plurality of battery loss values each corresponding to a plurality of time steps to obtain a pre-processed dataset;

selecting a loss indicator subset from the pre-processed dataset at a first time step and a second time step of the plurality of time steps based on a smart feature selection (SFS) algorithm, wherein the first time step is immediately prior to the second time step;

training a machine learning model with each battery loss indicator of the plurality of battery loss indicators in the loss indicator subset at the first and second time steps of the plurality of time steps and the battery loss value at the first time step; and determining the battery loss value at the second time step with the machine learning model to predict the battery capacity degradation;

wherein the plurality of battery loss values includes a battery cyclic loss value and a battery calendar loss value.

9. The system of claim 8, wherein the SFS algorithm comprises:

extrapolating the loss indicator subset to fill missing values in the pre-processed dataset;

extracting a mapping relationship between the plurality of battery loss indicators and the plurality of battery loss values from the pre-processed dataset at each time steps of the plurality of time steps based on a quantitative correlation analysis; and selecting one or more battery loss indicators from the plurality of battery loss indicators in the pre-processed dataset based on the mapping relationship to obtain the loss indicator subset.

10. The system of claim 8, wherein the plurality of battery loss indicators includes a distance travelled by an electronic vehicle having the lithium-ion battery, a charging efficiency of the lithium-ion battery, a discharging efficiency of the lithium-ion battery, an energy consumption at the first and second time steps, an internal resistance of the lithium-ion battery, and a temperature.

11. The system of claim 8, wherein the training further comprises:

splitting the loss indicator subset into a training data and a testing data;

training the machine learning model with the training data; and validating the machine learning model with the testing data.

12. The system of claim 11, wherein the machine learning model is selected from Linear Regression, Ridge Regression, Lasso Regression, Support Vector Regression, Gaussian Process Regression, Random Forest, ElasticNet, and XGBoost.

13. The system of claim 8, wherein the battery is a lithium-ion battery.

14. The system of claim 8, wherein the raw dataset includes a real-time data including a plurality of operating conditions obtained from the electric vehicle while operating.

* * * * *